US012425673B2

(12) United States Patent
Sallas et al.

(10) Patent No.: US 12,425,673 B2
(45) Date of Patent: Sep. 23, 2025

(54) SYSTEMS, METHODS, AND APPARATUSES FOR DEVICE LOCATION

(71) Applicant: Comcast Cable Communications, LLC, Philadelphia, PA (US)

(72) Inventors: Michael Sallas, Philadelphia, PA (US); Christian Buchter, Philadelphia, PA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 0 days.

(21) Appl. No.: 17/517,324

(22) Filed: Nov. 2, 2021

(65) Prior Publication Data
US 2023/0139356 A1    May 4, 2023

(51) Int. Cl.
*H04N 21/422*    (2011.01)
*H04N 21/45*    (2011.01)

(52) U.S. Cl.
CPC .  *H04N 21/42222* (2013.01); *H04N 21/42203* (2013.01); *H04N 21/42221* (2013.01); *H04N 21/4524* (2013.01)

(58) Field of Classification Search
None
See application file for complete search history.

(56) References Cited

U.S. PATENT DOCUMENTS

| | | | |
|---|---|---|---|
| 2015/0356030 A1* | 12/2015 | Zahand | G06F 13/20 710/17 |
| 2019/0126890 A1* | 5/2019 | Song | B60R 25/241 |
| 2022/0109983 A1* | 4/2022 | Barkam | H04W 4/38 |

* cited by examiner

*Primary Examiner* — Samira Monshi
(74) *Attorney, Agent, or Firm* — Ballard Spahr LLP

(57) ABSTRACT

Methods, systems, and apparatuses for device location are described herein. Location information of a lost control device may be determined based on sensing signatures according to various modalities. The sensing signatures may be based on responses to activated functions of the lost remote control. The location information may be determined based on an instruction received while the lost remote control is in an active state. Frequently lost remote controls may be in the active state more frequently. An alternative remote control may be selected as a substitute for the lost remote control before the lost remote control is found. The alternative remote control may be configured to control a device previously controlled by the lost remote control.

22 Claims, 12 Drawing Sheets

SYSTEMS, METHODS, AND APPARATUSES FOR DEVICE LOCATION

BACKGROUND

Various devices require remote controls for operation. For example, a media device may be communicatively paired to a remote control. Users may use the remote control to control operation of the media device, which may include selecting or viewing a content item offered by a content provider. Remote controls are often lost or misplaced. In some systems, users may cause the remote control paired to the media device to make a sound. The sound may be used to guide users while the users are searching for the lost remote control. The lost remote control may be located in a location where sounds generated are not easily perceivable by users such as being stuck under a cushion of a sofa. In such locations, it may be difficult for users to locate the lost remote control. These and other considerations are addressed herein.

SUMMARY

It is to be understood that both the following general description and the following detailed description are explanatory only and are not restrictive, as claimed. Methods, systems, and apparatuses for device location are described herein. The device location techniques described herein enable a user to be informed of a location of one or more devices in a home (e.g., mobile phones, media devices, associated remote controls, gaming controllers, etc.). In the event a device is lost, a command may be sent to the device to activate one or more functions of the device.

For example, the function may be causing the device to emit a sound, to activate a vibration element, to activate a light, combinations thereof, and/or the like. A result of activating the one or more functions of the device may be determined and used to generate a sensing signature. For example, the generated sensing signature may be indicative of a reflection of sound and/or light from the device's surrounding environment, an amount of vibration resulting from the device's surrounding environment, combinations thereof, and/or the like. Location information may be determined based on the sensing signature. For example, a vibration sensing signature may indicate a level of vibration feedback measured by an accelerometer, which may be compared to a threshold to determine the location information.

For example, a low level of vibration feedback may be used to determine that the device is on a soft surface such as a sofa cushion. For example, a light sensing signature may indicate a quantity of light sensed by a light sensor. A high quantity of light may be used to determine that the device is in a sock drawer, for example, a sensor may detect reflected light from the surface of the drawer when the backlight has illuminated the surface of the drawer. The determined location information may be caused to be output, such as output by a user device. Additional advantages will be set forth in part in the description which follows or may be learned by practice. The advantages will be realized and attained by means of the elements and combinations particularly pointed out in the appended claims.

BRIEF DESCRIPTION OF THE DRAWINGS

The accompanying drawings, which are incorporated in and constitute a part of this specification, illustrate embodiments and together with the description, serve to explain the principles of the methods and systems.

DETAILED DESCRIPTION

Figure 1:
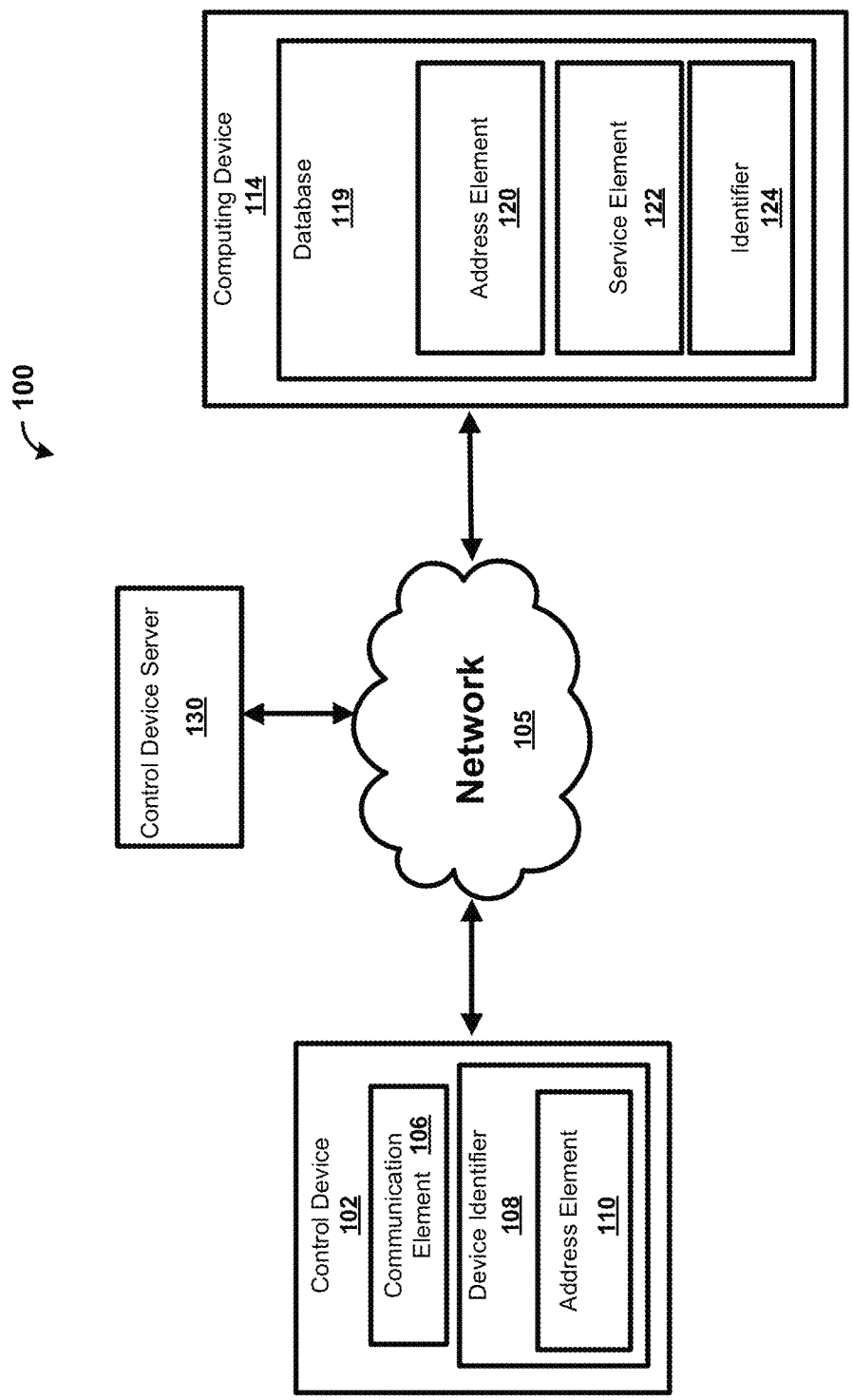
FIG. 1 shows an example environment in which the present methods and systems may operate.

Before the present methods and systems are described, it is to be understood that the methods and systems are not limited to specific methods, specific components, or to particular implementations. It is also to be understood that the terminology used herein is for the purpose of describing particular embodiments only and is not intended to be limiting.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Described are components that may be used to perform the described methods and systems. These and other components are described herein, and it is understood that when combinations, subsets, interactions, groups, etc. of these components are described that while specific reference of each various individual and collective combinations and permutation of these may not be explicitly described, each is specifically contemplated and described herein, for all methods and systems. This applies to all aspects of this application including, but not limited to, steps in described methods. Thus, if there are a variety of additional steps that may be performed it is understood that each of these additional steps may be performed with any specific embodiment or combination of embodiments of the described methods.

The present methods and systems may be understood more readily by reference to the following detailed description and the examples included therein and to the Figures and their previous and following description. As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, flash memory internal or removable, or magnetic storage devices.

Embodiments of the methods and systems are described below with reference to block diagrams and flowchart illustrations of methods, systems, apparatuses, and computer program products. It will be understood that each block of the block diagrams and flowchart illustrations, and combinations of blocks in the block diagrams and flowchart illustrations, respectively, may be implemented by computer program instructions. These computer program instructions may be loaded onto a general-purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that may direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, may be implemented by special purpose hardware-based computer systems that perform the specified functions or steps, or combinations of special purpose hardware and computer instructions.

FIG. 1 shows a system 100 that may be configured to use a control device 102 to control another device, such as to control content delivery services received by another device. One skilled in the art will appreciate that provided herein is a functional description and that the respective functions may be performed by software, hardware, or a combination of software and hardware. The control device 102 may be in communication with a computing device 114 such as a computer, a set-top box (STB), television, server, a display device, and/or the like. For example, the control device 102 may be in communication with the computing device 114 via a network 105. The network 105 may be a private and/or public network such as the Internet or a local area network. For example, the control device 102 may be wirelessly connected to the computing device 114 via a wireless connection. The wireless connection may be infrared, a Bluetooth® connection, a short-range wireless connection, a radio frequency (RF) connection, and/or the like. Other forms of communications may be used such as wired and wireless telecommunication channels. The control device 102 may be configured to control the computing device 114. For example, the control device 102 may be communicatively paired to the computing device 114. The computing device 114 may be disposed locally or remotely relative to the control device 102. The control device 102 and the computing device 114 may be in communication via the private and/or public network 105 such as the Internet or a local area network.

The control device 102 may be an electronic device such as a computer, a remote control, a smartphone, a laptop, a tablet, a gaming controller, or other device configured for controlling and/or communicating with the computing device 114. For example, the control device 102 may comprise a remote control. Users may interact with the remote control directly or indirectly. For example, a user may use the computing device 114 to configure settings associated with the remote control. For example, if the control device 102 is missing, misplaced, or lost, the user may use the computing device 114 to initiate an instruction to find the control device 102 and one or more other devices. The instruction may be referred to herein as a find my remote (FMR) command. The command may specify the quantity and type of devices that the user is searching for. For example, the user may send, via an application being executed on the computing device 114, a query specifying a device (e.g., remote control, the control device 102) to find.

When the computing device 114 is in an active state (e.g., capable of receiving a signal or message from a media device), the computing device 114 may receive the query as an instruction to determine the location information of the control device 102. The instruction may cause the control device 102 to activate a function according to configuration settings such as a type of sound to emit, a type of vibration pattern, whether light-emitting diodes (LEDs) of the remote control should flash, and/or the like. The configuration settings may be user-specific or specified by a user of the control device. The configuration settings may be manufacturer specific or defined during manufacture. The activated function may correspond to different modalities of the control device 102, such as a vibration modality (which may include applying forces, vibrations, or motions to a user or user device), light modality, sound modality, electromagnetic signal modality, camera modality, or microphone modality, and/or the like. The control device 102 may determine a sensing signature based on a response to the activated function. For example, a response to a time, type, and quantity of signals emitted by the device may be used by the control device 102 as feedback to determine the user requested location information of the control device 102. This way, the sensing signature may enable a device to output or indicate the user requested location information via a user interface of the user device.

The activated function may be performed by the control device 102 according to configuration settings of the control device 102 such as a modality of the activated function and modality parameters. The specified modality of the activated function may include: a type of sound, a pattern of light, a vibration pattern, a time and quantity of signals (e.g., light, wireless, vibration), electromagnetic detection, and/or the like. For example, the configuration settings may specify a tone or frequency of sound to accommodate disabled users having particular needs (e.g., accessibility needs). The control device 102 may emit sounds according to the specified tone or frequency to indicate location information of the control device 102, such as to identify a particular location in a house. For example, the configuration settings may specify a vibration pattern that the control device 102 may use to determine the location information. For example, a low or decreased response to the vibration pattern may indicate the remote is located on a soft surface such as a clothes drawer while a high or increased response to the vibration pattern may indicate that the control device 102 is located on a hard surface such as a table. For example, responses or feedback that comprises loud auditory feedback or a significant vibration response may indicate that the control device 102 is located on a hard surface (e.g., hard surface of table) or located in the drawer. Feedback that comprises low or no auditory feedback or low or no vibration response may indicate that the control device 102 is located on a soft surface, between cushions, or in the sofa, for example. Additional examples or combinations are described herein For example, the configuration settings may specify a light or wireless signal output pattern. For example, an amount of light sensed by a light sensor of the control device 102 or a radio frequency (RF) triangulation method (e.g., based on multiple devices receiving an RF signal) may be used to determine the location information. For example, low ambient light feedback may indicate the control device 102 is located in a cushion or under some other object, while low ambient light feedback may indicate the control device 102 is located in an enclosed space such as the drawer. Additional examples or combinations are described herein.

The control device 102 may comprise a communication element 106 for providing an interface to a user to interact with the control device 102 and/or the computing device 114. The communication element 106 may include any type of interface (e.g., physical buttons, microphone, trackpad, haptic interface, display, etc.) for presenting and/or receiving information to/from the user, such as user feedback. For example, the communication element 106 may include buttons such as directional buttons, channel up/down buttons, volume up/down buttons, numeric keypad buttons, power on/off buttons, and any other desired input buttons or the like. For example, the user feedback may be used to select a content playback function and/or control function via the communication element 106. The communication element may be used to cause the computing device 114 to perform any function, such as answering a door, setting the alarm, answering a phone, accessing the Internet, accessing settings, and/or the like. For example, the communication element 106 may be used by the user to power on/off the computing device 114, select an electric program guide, select a content channel, select volume of content being rendered by the computing device 114, play the content, pause the content, initiate a trick play operation such as a fast forward, rewind, skip operation, and/or the like. The communication element 106 may facilitate sending signals or data to a local or remote device, such as to the computing device 114, for performing a function related to content playback.

The communication element 106 may comprise one or more of a modem, transceiver (e.g., wireless transceiver)), encoder, decoder, modulator, demodulator and/or the like. The communication element 106 may be configured to allow one or more remote devices (e.g., in a local or remote portion of the network 105) to control the operation of the computing device 114. Other software, hardware, and/or interfaces may be used to provide communication between the control device 102, the computing device 114, a device/component associated with the computing device 114, and/or combination thereof. The communication element 106 may be used to request or query various files from a local source and/or a remote source. The communication element 106 may facilitate communication with a control device server 130, such as for rendering the content being output by the computing device 114. The communication element 106 may be any interface for the remote control to send or receive information to or from a device being controlled by the remote control, such as the computing device 114. The control device server 130 may be located at a different location than the control device 102. For example, the control device server 130 may be a server, a cloud-based device, and/or the like. In some instances, the control device server 130 may be located at the same location as the control device 102. For example, the control device server 130 may be a device within a local area network associated with the control device 102, such as a set-top box, an Internet-of-Things device, a controllable device, and/or any other type of device.

The control device server 130 may have a network communication function and a protocol conversion function. When located in the same network as the control device 102, such as within a LAN, the control device server 130 may convert a command received through the network 105 to an infrared (IR) command provided between a remote controller and an IR device. After receiving an operation command for the IR device from the remote controller, the control device server 130 may convert the operation command into an infrared command and transfer the infrared command to the IR component of the control device 102. For example, the control device server 130 may include a database of IR commands and the remote could download the IR commands from the remote control server and then transmit them to the IR device. This way, the IR device may be operated by the control device server 130. The control device server 130 may extract requested data from the IR device requested data. The control device server 130 may convert the extracted data into a format that can be played back by the computing device 114.

The control device 102 may be associated with a user identifier or identifier 108. The identifier 108 may be any identifier, token, character, string, or the like, for differentiating the control device 102 from another control device. The identifier 108 may identify the user or the control device 102 as belonging to a particular class of users or control devices. The identifier 108 may comprise information relating to the control device 102 such as a manufacturer, a model or type of device, a service provider associated with the control device 102, a state of the control device 102, a locator, and/or a label or classifier. The identifier 108 may be configured to differentiate one or more users and/or devices from other users and/or devices (e.g., another remote or mobile phone, etc.). The identifier 108 may be configured to identify a user, device, location, service, class, group, subscription, and/or the like. The identifier 108 may comprise device information (e.g., manufacturer, model, type of device), network information (e.g., network address, internet protocol address, media access content identifier), service information (e.g., service provider, service tier, business class, subscription), state information (e.g., idle, active), location information (e.g., country, geographic region), a label, a classifier, and/or the like regarding the control device 102. The identifier may be dynamic, static, temporary, and/or persist for a specified or unspecified time. Other information may be represented by the identifier 108.

The identifier 108 may comprise an address element 110 and a service element 112. The address element 110 may comprise or provide an internet protocol address, a network address, a media access control (MAC) address, an Internet address, and/or the like. The address element 110 may be relied upon to establish a communication session between the control device 102 and the computing device 114 or other devices and/or networks. For example, the control device 102 may be configured to control the computing device 114. For example, the control device 102 may be communicatively paired to the computing device 114 by sending and receiving signals via pairing the address element 110 with an identifier of the computing device 114, such as a unique network address (e.g., address element 120). The unique network address of the computing device 114 may be stored in memory (not shown) of the control device 102. The address element 110 may be used as an identifier or locator of the control device 102. The address element 110 may be persistent for a particular network. The address element 110 may be used to identify or retrieve data from the service element 112, or vice versa.

The computing device 114 may render a user interface (UI). The UI may be part of an application, such as a mobile application executed on the computing device 114. The mobile application may be part of a remote control discovery function, for example. For example, a user may use the communication element 106 to send an instruction to the user device to find the control device 102 or any other devices (e.g., remote controls), such as via an command. For example, the FMR instruction may cause a signal to be forwarded to the control device 102. For example, the signal may function as a check-in message that checks whether the control device 102 is in an active state. For example, the instruction to the user device may cause the computing device 114 to send the check-in message to the control device 102. The UI may include a communication interface such as a web browser (e.g., Internet Explorer®, Mozilla Firefox®, Google Chrome®, Safari®, or the like), media player, application (e.g., web application, mobile application, media device application), and/or the like. The user may request location information of the control device 102 based on the control device 102 sending a response to the check-in message.

The control device 102 may receive the check-in message or the instruction to determine the location information of the remote control when the remote control is in an active state. For example, the active state may refer to the control device 102 as capable of receiving messages, such as being powered on and available to receive check-in messages from other devices (e.g., media devices). A quantity (e.g., number of instances) that the instruction to determine location information was received may be determined. For example, the determined quantity may be indicative of how often the remote control is lost. For example, the frequency of check-in messages received by the remote control may be tracked and stored as metadata in a database 119. For reduction of power consumption, a power cycle of the control device 102 may be adjusted based on the determined quantity. The power cycle may define a periodicity of the active state of the control device 102. For example, the periodicity of the control device 102 (e.g., recurrence of changing from a sleep state to an active state) may be changed such that the periodicity is higher for control devices that have a high determined quantity and the periodicity is higher for control devices that have a low determined quantity. For example, the periodicity may be increased for control devices that are frequently lost and the periodicity may be decreased for control devices that are infrequently lost.

The user may use a different alternate device to substitute for the operation of a lost device, such as a lost control device 102. For example, the user may select an alternate remote control to be configured to control another device (e.g., media device, computing device 114) that was previously configured to be controlled by the control device 102. The user may select the alternate remote control via a user interface that is configured to output a list of proximate alternate devices (e.g., a list of alternate remote controls in the vicinity of the user), such as output on the UI of the computing device 114. The interface may be displayed on a media device, control device, computing device, user device, personal device, or combinations thereof. For example, the UI of the computing device 114 may be rendered to display information (e.g., identifier, media address control address, etc.) related to proximate alternative remote controls that are selectable by the user. The computing device 114 may receive a selection of an alternative remote control of the proximate alternative remote controls. For example, the user may bring the selected alternate remote control in proximity with the computing device 114 to initiate pairing between the alternate remote control and the computing device 114. The alternate remote control may be configured by pairing the alternate remote control to the computing device 114 (e.g., communicatively pairing to a network address of the computing device 114). For example, pairing arrangements of the alternate remote control and the lost remote control may be changed so that the alternate remote control may temporarily control the computing device 114, such as a powered-on television that was originally controlled by the lost control device 102.

The computing device 114 may be a media device such as a computer, set-top box (STB), television, server, gateway, a display device, monitor, digital streaming device, and/or the like for communicating with the control device 102. The computing device 114 may communicate with the control device 102 for providing data and/or services, such as according to commands or instructions sent by the control device 102 to the computing device 114. For example, the control device 102 may instruct the computing device 114 to output a particular content program or content channel, such as a specific television channel. The computing device 114 may provide services such as network (e.g., Internet) connectivity, content services, streaming services, broadband services, network printing, media management (e.g., media server), or other network-related services. The computing device 114 may allow the control device 102 to interact with remote resources such as data, devices, and files (e.g., user data stored in a personal computer or external computing storage). For example, the computing device 114 may enable the user device of the control device 102 to access user stored pictures or the remote control of the control device 102 to select an Internet browser for conducting a web search.

The computing device 114 may manage the communication between the control device 102 and a database 119 for sending and receiving data therebetween. The database 119 may store location data (e.g., sensing signatures, locations where the control device 102 has been found), user identifiers or records, or other information. For example, the database 119 may store user credentials, user actions, user access history information (e.g., Internet access history, content program selection history), user preference information, and/or the like associated with usage of the user device or remote control of the control device 102. For example, the database 119 may store metadata such as a frequency of commands or instructions to determine location information of a device, a record of where various devices were found after previous instances that the instructions to find the respective devices were received by the computing device 114, and/or the like. For example, the database 119 may store information indicative of a remote control being found stuck in a sofa, drawer, or elsewhere the last instance or instances that an FMR command or commands for the remote control were received.

The control device 102 may request and/or retrieve a file from the database 119. The database 119 may store information relating to the control device 102 such as the address element 110 and/or the service element 112. The database 119 may store information relating to the computing device 114 such as the address element 120 the service element 122, and/or the identifier 124. The identifier 124 may be configured to differentiate one or more users and/or devices from other users and/or devices (e.g., another STB, television, etc.). The identifier 124 may be configured to identify a user, device, location, service, class, group, subscription, and/or the like. The identifier 124 may comprise device information (e.g., manufacturer, model, type of device), network information (e.g., network address, internet protocol address, media access content identifier), service information (e.g., service provider, service tier, business class, subscription), state information (e.g., idle, active), location information (e.g., country, geographic region), a label, a classifier, and/or the like regarding the computing device 114. The identifier may be dynamic, static, temporary, and/or persist for a specified or unspecified time.

The computing device 114 may obtain the identifier 108 from the control device 102 and retrieve information of the control device 102 from the database 119 such as the address element 110 and/or the service elements 112. The computing device 114 may obtain the address element 110 from the control device 102 and may retrieve the service element 112 from the database 119, or vice versa. Any information may be stored in and retrieved from the database 119. The database 119 may be disposed remotely from the computing device 114 and accessed via a direct or indirect connection. The database 119 may be integrated with the computing device 114 or some other device or system.

Network devices may be in communication with a network such as the network 105. The network devices may facilitate the connection of a device, such as the control device 102 and/or the computing device 114 to the network 105. The network 105 may comprise public networks, private networks, wide area networks (e.g., Internet), local area networks, and/or the like. The network 105 may comprise a content access network, content distribution network, and/or the like. The network 105 may be configured to provide communication between the control device 102, the computing device 114, and/or any other devices/components of the system 100. Although shown as a single network, the network 105 may include multiple networks. For example, the network 105 may include a first network configured to enable the computing device 114 and/or any other devices/components to communicate, such as a local area network. The network 105 may also include a wide-area network, such as the Internet, that facilitates communication between any device component shown in and/or associated with the system 100. The network 105 may comprise network adapters, switches, routers, modems, and the like connected through wireless links (e.g., radio frequency, satellite) and/or physical links (e.g., fiber optic cable, coaxial cable, Ethernet cable, or a combination thereof). The network devices may be configured as a wireless access point (WAP). The network devices may be configured to allow one or more wireless devices to connect to a wired and/or wireless network using Wi-Fi, Bluetooth or any desired method or standard. The network devices may be configured as a local area network (LAN). The network devices may comprise a dual-band wireless access point.

The network devices may be associated with an identifier. The identifier may be or relate to an Internet Protocol (IP) Address IPV4/IPV6 and/or a media access control address (MAC address) and/or the like. The identifier may be a unique identifier for facilitating communications on the physical network segment. For example, the computing device 114 and the control device 102 may use the same or different identifier. The control device 102 may use the same or a different identifier as the computing device 114. For example, the control device 102 may be assigned a specific unique identifier (e.g., identifier 108) such as a unique MAC address. The control device 102 may be configured to control the computing device 114 based on being paired to a unique MAC address (e.g., identifier 124) of the computing device 114 and/or being configured to send information to a pairing address so that the control device 102 and computing device 114 are paired together. The control device 102 may cease to be paired to and/or cease to control the computing device 114 based on a lost another device that was previously configured to control the computing device 114 being found. For example, the control device 102 may be configured to control a different device based on the another device being found.

Figure 2:
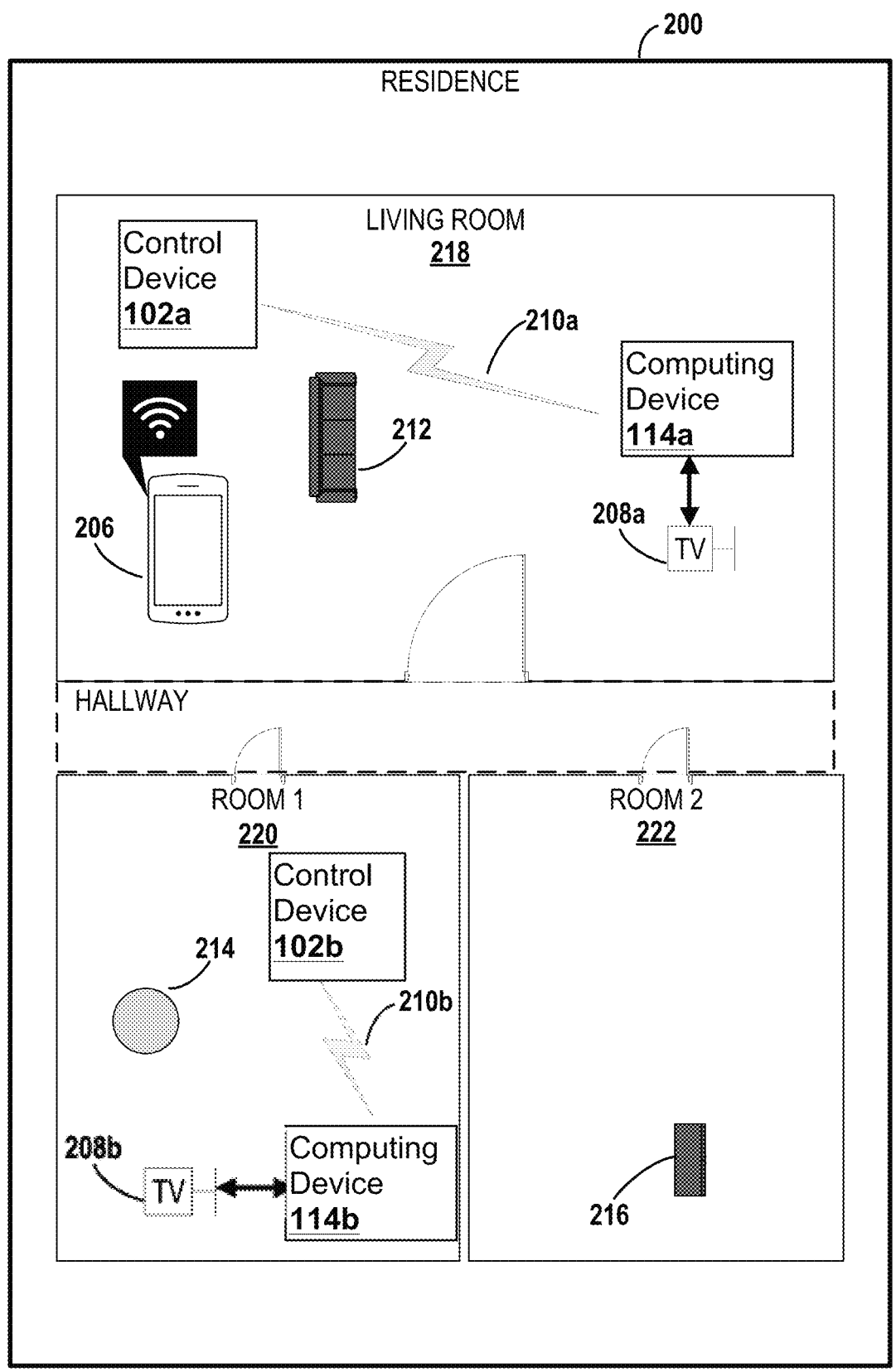
FIG. 2 shows an example environment in which the present methods and systems may operate.

FIG. 2 illustrates various aspects of an example environment in which the present methods and systems can operate. The environment is relevant to systems and methods for device location, such as location of a remote control provided by a content provider, a mobile user device (e.g., smartphone), and/or the like. The example environment may include a residence 200, which may be a home, apartment, restaurant, office, building, and/or the like. The residence 200 may contain multiple devices, such as a plurality of STBs, televisions, remote controls, mobile telephonic devices (e.g., smartphones), media devices, and/or the like. A subset of the multiple devices may be controllable devices that are configured to be controlled by other devices. For example, a smartphone and/or remote control may be configured to control a particular STB or computing device 114, as computing devices 114a-114-b. For example, a control device 102a may be configured to control a computing device 114a and a remote control 102b may be configured to control a computing device 114b. The remote controls 102a-102b may be communicatively paired to the computing devices 114a-114b via respective pairings 210a-210b to respective network addresses (e.g, identifier 124 such as MAC address) of the computing device 114a-114b. Similarly, the remote control 102b may be communicatively paired to the computing device 114b. The computing devices 114a-114b may be configured to operate and/or control output of content to the televisions 208a-208b. For example, the computing devices 114a-114b may cause the televisions 208a-208b to display a content channel and/or content program provided by a content provider, such as based on a selection that is input via buttons of the control devices 102a-102b.

The televisions 208a-208b may be capable of playing and/or rendering television video and audio content, multimedia computer files, streaming HTML files (e.g., as an Internet-enabled television), and/or the like. The televisions 208a-208b may receive one or more content items on a particular content channel (e.g., television channel), on multiple content channels, and/or via streaming (e.g., via the Internet). At least one of the control device 102a-102b, computing devices 114a-114b, televisions 208a-208b may be in communication with a user device 206. For example, at least one of the control device 102a-102b, computing devices 114a-114b, televisions 208a-208b may receive signals from the user device 206, such as based on user inputs via a user interface (UI) of the user device 206. For example, the user device 206 may be configured to access a network (e.g., network 105 such as the Internet) to send signals, instructions, and/or messages to other devices located in the residence 200 and/or remotely from the residence 200. The user device 206 may be a device capable of receiving a user input and displaying and/or outputting content such as via rendering the content on a display of the user device 206 according to an application executed by the user device 206. For example, the application may be a lost device and/or FMR application designed to enable and/or assist a user to find lost devices and to manage media services provided to the user. The user device 206 may be an electronic device such as a mobile device (e.g., a smartphone, telephone, tablet), laptop, computer, projector, output screen, television, STB, and/or other devices capable of receiving user inputs, executing applications, and communicating with other devices.

For example, the user device 206 may receive instructions from a user via user input (e.g., computing mouse, keyboard, keypad, touchscreen, etc.) to initiate an command (e.g., FMR query or FMR command) to find a specified one or more devices according to a user query. For example, lost devices may be located in a location of the residence 200 that is unknown to the user (e.g., the user has forgotten the most recent location of the control device 102a) such as a living room 218, room 1 220, room 2 220, and/or any portion thereof. For example, the control device 102a may be a lost device by virtue of being lost inside a sofa 212, left on table 214, in a drawer 216, and/or the like. An FMR query identifying the control devices 102a-102b may cause the user device 206 to request state information (e.g., location information) of the control device 102a-102b. The user device 206 may instead cause a media device (e.g., computing devices 114a-114b, televisions 208a-208b, server, etc.) to request the state information of the control device 102a-102b. For example, if the FMR query is sent to a media device in a standby state, such as a powered-off media device, the FMR query may cause the media device to power on. In response to the FMR query, stored activity and performance information, as well as the determined location information of the specified control devices 102a-102b may be output to the user device 206.

To initiate the FMR query, the user may use the UI of the user device 206 or a UI output by the computing device 114, activate the query on the media device such as press a button on the media device, utter a voice command (e.g., verbally ask where a lost device is located) identifying the lost device), and/or the like. For example, the user may press a physical button on an computing device 114a paired to the control device 102a to find the control device 102a if it is lost, misplaced, or otherwise cannot be found by the user. The user may interact with the FMR application executed by the user device 206 to view a graphical indication of all the devices in the residence 200. For example, the FMR application may cause the UI or display of the user device 206 to display an indication (e.g., a list output on the UI, graphical floor plan layout of the residence 200, etc.) of all the media devices and associated control devices 102a-102b (e.g., configured to control the media devices) located in the residence 200. This UI display may enable the user to initiate commands to find all or a subset of the devices in the residence 200. For example, the user may initiate an command (e.g., FMR command) by hovering over/haptically selecting indications of one or more devices on the rendered UI interface of the user device 206. For example, the user may type in an instruction to determine location information associated with selected devices or verbalize the instruction via a voice module of the user device 206.

The instruction may comprise a query specifying criteria that some devices in the residence 200 may fulfill. The criteria may be location-based or state-based, for example. For example, the criteria may include a location criterion, a usage time criteria, pairing criteria, a remote type criteria, a signal strength criteria, a voice control criteria, a number key criteria, a backlight criteria, an identifier criteria. For example, the criteria may be various locations in the residence 200, such as a specific room in the residence 200 (e.g., room 1 220), a set of rooms (e.g., room 1 220 and room 2 222), a portion of the residence 200 (e.g., upstairs, downstairs, etc.). For example, the criteria may be state-based such as all devices or pairings with devices (e.g., televisions 208a-208b) that are powered on, device(s) that was last used by the user, all control devices paired to a device being controlled, a specific type of control device 102a-102b, a device having a specific signal strength, voice control capability, number key functionality, backlight functionality, specific identifier (e.g., identifier 108). The criteria of the instruction may be selected via and/or displayed on the UI interface of the user device 206. The received instruction may cause the selected devices to activate respective functions for determining respective location information via location analysis. The location analysis may be active analysis or passive analysis. The selected devices may determine a sensing signature based on respective responses to the respective activated functions.

The sensing signature may be determined based on one or more of several sensing modalities, such as a sound modality, light modality, wireless signal modality, a vibration modality, or an electromagnetic modality. For example, the sound modality may involve determining a sound sensing signature based on location-specific feedback to an emitted sound. For example, feedback that comprises low amplitude feedback may indicate selected control device 102a is located in sofa 212 or on a soft surface, feedback that comprises medium amplitude feedback may indicate the selected control device 102a is located on a hard surface (e.g., hard surface of table 214), and feedback that comprises high amplitude feedback may indicate the selected control device 102a is located in the drawer 216. For example, the light modality may involve determining a light-sensing signature based on a light pattern such as a backlight flashing pattern or a response to output light. For example, low ambient light feedback may indicate the selected control device 102a is located in a cushion or under some other object, and/or indicate the selected control device 102a is located in an enclosed space such as the drawer 216.

For example, the wireless signal modality may involve determining a wireless signal sensing signature based on signal strength measurements such as comparison to a baseline signal strength or positional points. For example, a high signal strength measurement may indicate the selected control device 102a is proximate or within range or a viewing distance of a television 208a or other device that originates a wireless signal to the selected control device 102a, a medium signal strength measurement may indicate the selected control device 102a is within a normal viewing area of the user, a low signal strength measurement may indicate the selected control device 102a has been removed from the room of the residence 200 that the user is currently located at. For example, the wireless signal sensing signature of the selected control device 102a may be determined via RF triangulation of all broadcasting computing devices in the residence 200 (e.g., computing devices 114a-114b). The computing devices 114a-114b may use RF parameters such as time delay of arrival (TDOA), phase, signal strength, and/or the like of an RF signal sent by a transmitter of the selected control device 102a to triangulate a location of the selected control device 102a.

Based on the sensing signature, the respective location information of the selected devices may be determined. For example, the vibration modality may involve determining a vibration sensing signature based on a feedback response to vibration patterns such as an amount of dampening or auditory feedback. For example, feedback that comprises loud auditory feedback or a significant vibration response may indicate that the selected control device 102a is located on a hard surface (e.g., hard surface of table 214) or located in the drawer 216. Feedback that comprises low or no auditory feedback or low or no vibration response may indicate that the selected control device 102a is located on a soft surface, between cushions, or in the sofa 212, for example. A combination of sensing modalities may be used to determine the sensing signature. The determination of the sensing signature may be based on a sensing signature threshold. For example, the threshold may be adjusted based on a machine learning algorithm. The respective location information may be determined based on the sensing signature. The determined respective location information of the selected devices may be sent to the user device 206 and an indication of this information may be output on the UI of the user device 206. The selected devices may also use microphone and camera analysis to facilitate determination of respective location information, such as using audio or video detection by the selected control device 102a to determine whether the user is in the same portion of the residence 200 looking for the selected devices. The selected devices may also use metadata such as historical record metadata in the database 119 to facilitate or corroborate whether the selected devices have previously been lost at or been found at the determined location.

When the FMR query or instruction to determine location information associated with the selected control device 102a is sent to a specific media device, the user may be provided an option to substitute another device for the selected control device 102a. For example, the another device may be control device 102b and indicated as one of a plurality of alternative devices via the UI of the user device 206. The plurality of alternative devices may be proximate control devices that are within a threshold vicinity of the control device 102a (e.g., the control device 102). For example, the plurality of alternative devices may include the control device 102b because control device 102b is located in room 1 220, which is within the threshold vicinity of the control device 102a. Depending on the quantity of the threshold vicinity, other control devices located in other portions of the residence 200 such as the upstairs portion of the residence 200 may or may not be listed as a selectable device indicated on the UI of the user device 206. The user may indicate which different alternate device to use as a substitution for the operation of a lost device, such as a lost remote control. For example, the UI may output an option to select eligible alternative devices of the plurality of alternative devices. The user may input via the user device 206 their selection of the option, such as selecting the control device 102b. The control device 102b may have an existing configuration to control computing device 114b, such as via the pairing 210b. The control device 102b may have no existing configuration, such as being unpaired to any device being controlled. Unpaired control devices may emit periodic broadcasts to indicate this unpaired status to a pairing management device (e.g., the computing device 114a, the computing device 114b, the computing device 114). For example, a back-end user account server may send a message to the user device 206 informing the user of an unpaired control device shipped to the residence 200 that should be available for use by the user. The periodic broadcasts may enable the user to initiate pairings for any unpaired devices, as desired. For example, the control device 102b may be reconfigured to control the computing device 114a, which was originally controlled by the control device 102b via the pairing 210a. This way, existing communicative pairings between control devices and controlled devices such as control devices 102a-102b and computing devices 114a-114b may be switched. The switching may be temporary and reversed when the user finds the corresponding lost device(s) after sending an command (e.g., FMR command). For example, if the user initiates an command for the control device 102a that has an existing configuration to control computing device 114a while the associated television 208a is powered on, the control device 102a is presumably lost. Accordingly, the user device 206 may present an option to switch the configuration of control device 102b that has an existing configuration to control the computing device 114b associated with television 208b so that the control device 102b is borrowed and configured to control the computing device 114a instead. The selected substitute control device 102b may be an extra control device that the user physically brings within proximity of the computing device 114a to indicate that the user desires to change the configuration of control device 102b. For example, the user may press a button on the computing device 114a to confirm that control device 102b should be paired to computing device 114a. If the presumably lost control device 102a cannot be found, the user may receive a permanent replacement control device, such as from a content provider.

The control device may receive the command or instruction to determine location information associated with selected devices when the selected devices are in an active state. The active state may be determined based on each corresponding selected device sending responses to check-in messages from other devices (e.g., media devices) that received the command. Whether a selected device such as the control device 102a is in an active state and capable of receiving check-in messages from a media device such as the computing device 114a (and sent by the user device 206) may depend on a power cycle. The power cycle may define when or how often a corresponding device is in an active state or a sleep state. For example, a parameter such as periodicity of the power cycle of the control device 102a may indicate when the control device 102a transitions from the sleep state to the active state. For example, the periodicity may be a transition once every ten minutes, every hour, every three hours, or some other suitable periodicity. The power cycle may be adjusted according to determined patterns, such as to reduce power consumption. For example, the aggressiveness of the power cycle (e.g., how high the periodicity is set at) may be adjusted or set depending on whether a determined pattern indicates that a particular device is frequently lost or infrequently lost. For example, the determined pattern may be a quantity associated with an instruction to determine location information associated with the control device 102a was received, which indicates how frequently the control device 102a has historically been lost. This quantity may be stored as metadata such as in a database (e.g., database 119). For example, this quantity may be used to dynamically increase the periodicity for the control device 102a if the quantity indicates that it is frequently lost or decrease the periodicity for the control device 102a if the quantity indicates that it is infrequently lost. In general, the active state periodicity may be increased for frequently lost devices and decreased for infrequency lost devices depending on whether a corresponding quantity of instructions for the corresponding device is a relatively high quantity or a relatively low quantity. This adjustment may result in the reduction of power consumption because the higher the active and/or wake-up state periodicity, the more often the control device 102a enters the active state and consumes power such as by virtue of expending power to perform functions or being available to receive messages from other devices such as media devices. The adjustment to the periodicity or the power cycle may be based on other factors besides the quantity associated with instructions have been received. For example, the adjustment to the periodicity or the power cycle may be based on the battery life of a device subject to an command, battery voltage of the device, battery drain rate of the device, user interaction with the device (e.g., how often the device is moved), time of day, and/or the like.

Figure 3:
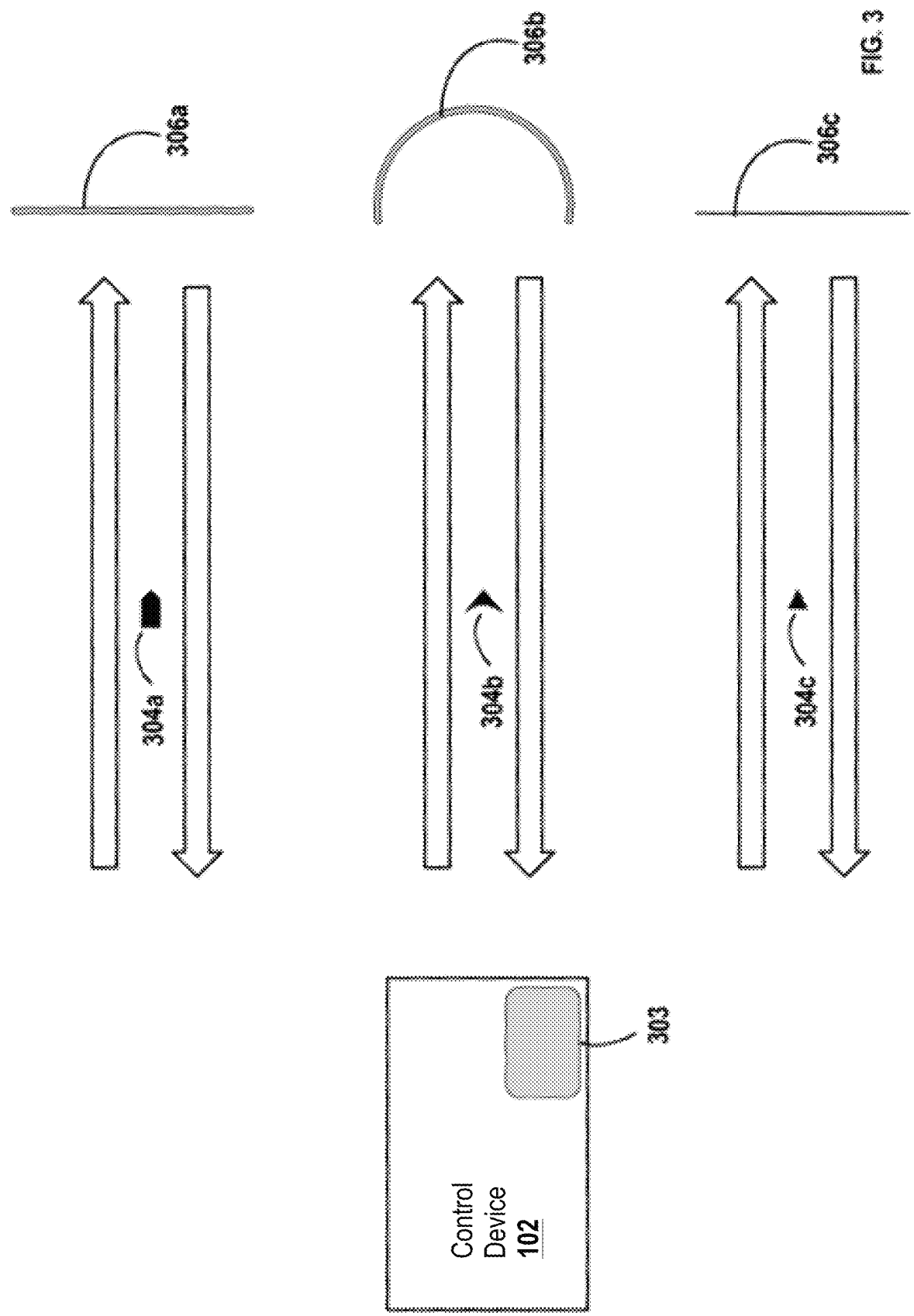
FIG. 3 shows an example remote control.

FIG. 3 illustrates various aspects of an example control device 102 related to the present methods and systems. The control device 102 may be a smart remote control. The control device 102 may comprise a sensor module 303 capable of activating functions of different modalities. For example, the sensor module 303 may activate a function according to modalities such as a vibration modality, light modality, sound modality, electromagnetic signal modality, camera modality, or microphone modality, and/or the like. Activation of a function of the control device 102 via the sensor module 303 according to different sensing modalities may be used to determine location information of the control device 102, such as to identify a particular location in a house. For example, the configuration settings may specify a vibration pattern that the control device 102 may use to determine the location information. For example, a low or decreased response to the vibration pattern may indicate the remote is located on a soft surface such as a clothes drawer while a high or increased response to the vibration pattern may indicate that the control device 102 is located on a hard surface such as a table. As an example, a type of surface such as a rigid surface 306a, enclosed surface 306b, or soft surface 306c. The type of surface may be used to determine location information associated with the control device 102. The control device 102 may determine a response to the activated function of the control device 102 via the sensor module 303. The control device 102 may determine a sensing signature based on the response to the activated function. For example, the activated sensing function 304a may be according to the vibration modality. The activated sensing function 304a may be generating, via the sensor module 303, a vibration pattern, such as a user specified vibration pattern. If the control device 102 is located on the rigid surface 306a, then this vibration pattern generated relative to the rigid surface 306a may cause a specific response that corresponds to identifying the surface of the control device 102 as the rigid surface 306a. The specific response may be a maximum or high vibration response as detected by an accelerometer of the of the control device 102, for example.

Based on the extent of the specific response, a sensing signature may be determined, such as a sensing signature that corresponding to a high vibration response. The control device 102 may use this sensing signature to determine location information such as determining that it is located on the rigid surface 306a, that it is located on top of a drawer (e.g., drawer 216), and/or the like. The activated sensing function 304a may include other sensing functions according to other sensing modalities in addition to the vibration modality. For example, the activated sensing function 304a may comprise emitting, via the sensor module 303, a light pattern according to a light modality, such as a flashing of a backlight of the control device 102. The emitted light pattern may cause a response corresponding to a specific light-sensing signature. The specific light-sensing signature may indicate how much of the emitted light pattern is reflected back and sensed by a light sensor of the control device 102 or indicate a quantity of ambient light. Based on this indication, the control device 102 may determine that it is located on the rigid surface 306a. For example, the activated sensing function 304a may comprise generating, via the sensor module 303, a sound according to a sound modality, such as playing a sound by a speaker of the control device 102. The generated sound may cause a response corresponding to a specific sound feedback, such as that sensed by a microphone of the remote control 102. For example, the activated sensing function 304a may comprise sending, via the sensor module 303, a time and quantity of signals such as wireless signals according to an electromagnetic signal modality. The wireless signals may be a plurality of RF signals for triangulation or for any other suitable method to determine location information associated with the control device 102.

The plurality of RF signals may cause a varying response that may be used to determine the location information. For example, RF signal strength may vary depending on which of multiple different physical and RF environments that the control device 102 is located in. To determine a sensing signature based on this varying RF signal strength, a baseline signal strength may be determined. The baseline signal strength may be based on determining a mean signal strength at a plurality of normal viewing locations, such as a couch (e.g., sofa 212) in front of a television (e.g., television 208a), a location in a kitchen where the television is viewable, and the like. The baseline signal strength may be used to interpret the sensing signature based on a detected signal strength for the control device 102. The specific response to the sent wireless signals may be used to determine the sensing signature and to determine that the sensing signature corresponds to the rigid surface 306a. The quantity of the signal strength corresponding to the determined sensing signature may be compared to the baseline mean signal strength to assess where the control device 102 is likely located in relation to the plurality of normal viewing locations. For example, if the quantity of signal strength is within a threshold different of a user's mean signal strength, it may be determined that the control device 102 is likely located proximate the user's normal viewing area.

If the quantity of signal strength is relatively low compared to the user's mean signal strength, it may be determined that the control device 102 is likely located out of the user's normal viewing area, such as the control device 102 having been removed from the normal viewing area (e.g., the living room of the residence 200). If the quantity of signal strength is relatively high compared to the user's mean signal strength, it may be determined that the control device 102 is likely located close to the user's normal viewing area such as close to the television 208a. The interpretation of the sensing signature may be based on a triangulation algorithm, a machine learning algorithm, or may involve the use of parameters such as a time difference of arrival (TDOA), multilateration, phase, and/or the like. For example, the activated sensing function 304a may involve using a microphone or a camera to determine the location information according to the camera modality or microphone modality. The microphone and the camera may be located locally or remotely from the control device 102. For example, video feed from the camera, another sensor (e.g., motion sensor), sensory input, or combinations thereof may be used to facilitate identification of the location information, such as by verifying that the control device 102 is located on the rigid surface 306a if the rigid surface 306a is within the field of view of the camera. For example, the response to the activated sensing function 304a may be receiving sound feedback via the microphone of the control device 102 and the control device 102 may determine whether the sensing signature corresponding to this sound feedback indicates the user moving around looking for the control device 102 (e.g., sound disturbances as the user moves around a room searching for the lost control device 102).

The user may be informed of the determined location information of the control device 102 such as via the user device 206 or a media device such as the computing device 114a. For example, the UI of the user device 206 may indicate that the control device 102 is likely located on the rigid surface 306a, located in the user's normal viewing area, that the control device 102 is likely located in the vicinity of the user's current location, and/or the like. The control device 102 may use multiple modalities in conjunction to analyze its location information, such as one or more of those described in relation to the activated sensing function 304a. The sensor module 303 may use one or more different type of sensing functions depending on the type of surface or location that the control device 102 may predict it is located at. For example, metadata may indicate that the control device 102 has frequently been found in an enclosed space such as inside a drawer (e.g., drawer 216). For example, the metadata may indicate that the last time(s) the user initiated an command regarding the control device 102, the control device 102 was located inside the drawer 216. Accordingly, the activated sensing function 304b may be emitting, via the sensor module 303, a light pattern according to the light modality to verify whether the control device 102 is inside the drawer 216.

If the control device 102 is located inside the drawer 216, a light sensor (e.g., in the sensor module 303) of the control device 102 may sense a burst of light based on the emitted light pattern. For example, the emitted light pattern may be based on flashing the backlight of the control device 102. The sensing signature corresponding to this burst of light may indicate that the control device 102 is located in an enclosed space such as on the enclosed surface 306b, such as being inside the drawer 216. The activated sensing function 304b may involve multiple sensing modalities to confirm that the control device 102 is located in the enclosed surface 306b or inside the drawer 216. For example, the vibration modality may be used in conjunction with the light modality. The light-sensing signature determined by the control device 102 may indicate that the control device 102 is in a confined space or otherwise exposed to ambient light (e.g, light in a room of the residence 200). A vibration sensing signature determined based on a high vibration response may be used to determine what category of materials that a surface of the enclosed surface 306b is categorized within. For example, a higher vibration response may be indicative of a rigid/hard wooden material while the lower vibration response may be indicative of a cushion material. Loud auditory feedback corresponding to the higher vibration response may be indicative of the wooden material such as the wooden material of the drawer 216.

Based on the light sensing signature being indicative of the enclosed surface 306b and the vibration sensing signature being indicative of the wooden material, the control device 102 may determine that its location is the drawer 216. For example, the specific sensed light sensing signature may enable the control device 102 to distinguish between the wooden material of a table (e.g., table 214) and wooden material inside the drawer 216. For example, a high amplitude sound feedback via the microphone of the control device 102 may further support a conclusion that the control device 102 is located in the drawer 216 because the high amplitude sound feedback is indicative of reflection of sound waves off the enclosed surface 306b of the drawer 216. For example, the sensor module 303 may execute one or more different type of sensing functions such as the sensing function 304c to determine that the sensor module 303 is located on the soft surface 306c. For example, the activated sensing function 304c may comprise emitting, via the sensor module 303, the light pattern according to the light modality via the backlight of the control device 102. The response to the light pattern may be used to determine a light-sensing signature corresponding to the soft surface 306c. The light-sensing signature may indicate the soft surface 306c because a relatively low quantity of light is sensed by the light sensor of the sensor module 303, which may indicate that the control device 102 is located immediately under the soft surface 306c.

The location of the control device 102 relative to the soft surface 306c may cause only a limited amount of light of the emitted light pattern to be reflected back. For example, the activated sensing function 304c may comprise generating, via the sensor module 303, the vibration pattern according to the vibration modality so that a sensing signature (e.g., haptic) may be determined based on low or no vibration response. The sensing signature may be used to determine the soft surface 306c because little to no auditory feedback is received in response to the vibration pattern. By comparing the vibration sensing signature to a baseline level, the control device 102 may determine that the soft surface 306c is part of a sofa cushion that dampens the response to the vibration pattern. For example, the activated sensing function 304c may comprise playing, via the sensor module 303, the sound according to the sound modality. The response measured by the microphone of the control device 102 may be used to determine a sound sensing signature indicative of a type of speaker signal. The sound sensing signature may be indicative of the soft surface 306c based on corresponding to a low or minimal speaker signal. The low speaker signal of the sound sensing signature may be due to the speaker signal being absorbed by the soft surface 306c or the sofa cushion. Accordingly, the control device 102 may determine its location information based on one or more sensing signatures.

Figure 4:
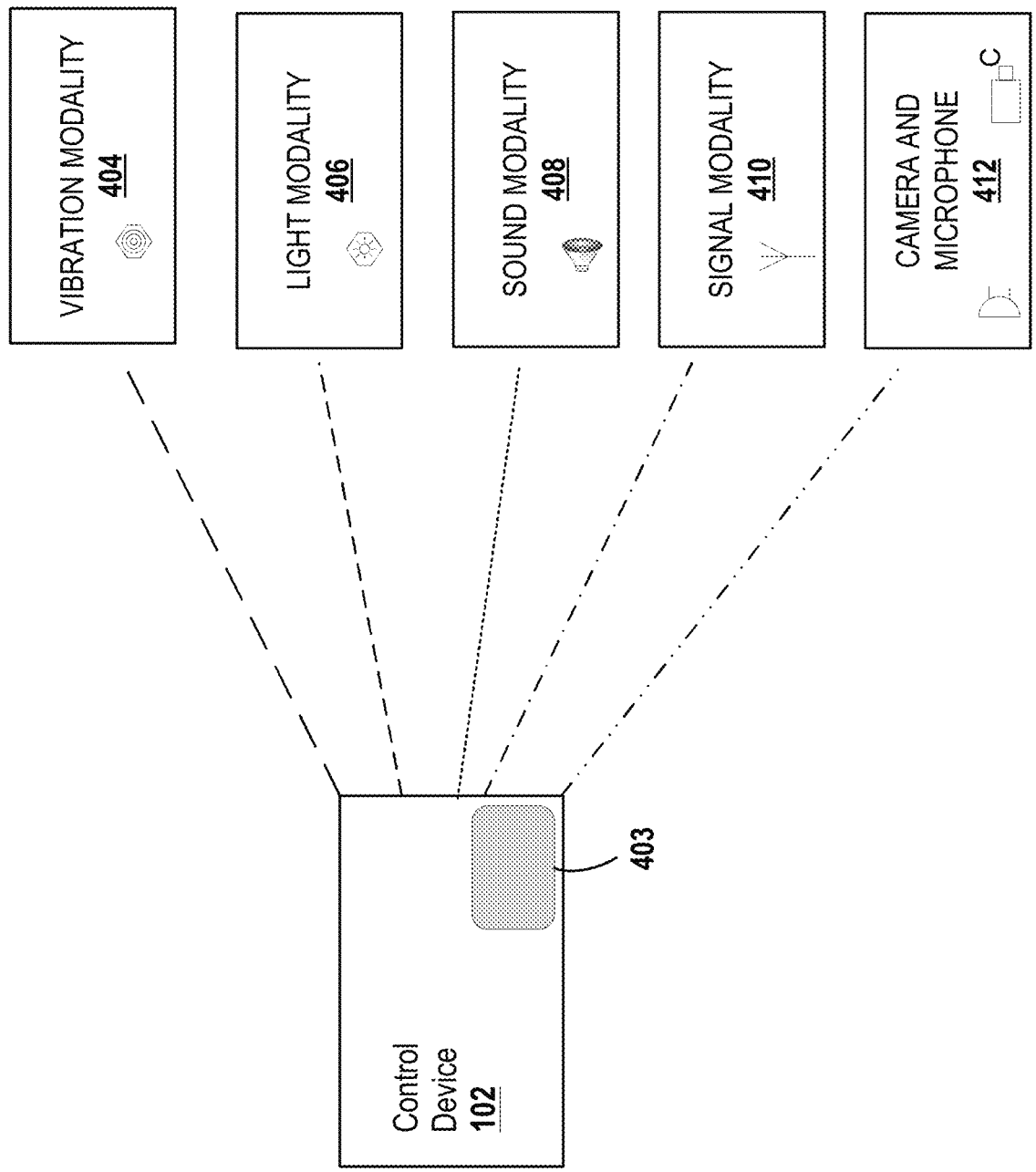
FIG. 4 shows an example remote control.

FIG. 4 illustrates various aspects of an example control device 102 related to the present methods and systems. The control device 102 may be a smart control device. The control device 102 may comprise a sensor module 403 capable of activating functions of different modalities. For example, the sensor module 403 may activate a function according to modalities such as a haptic or vibration modality 404, light modality 406, sound modality 408, electromagnetic signal modality 410, camera or microphone modality 412, and/or the like. A user of the control device 102 may configure the control device 102, such as configuring settings or parameters of the various modalities. The configuration of settings may be performed by the user via a UI of a user device (e.g., user device 206). For example, the UI may render or execute an application on the user device 206. The application may also be executed on a media device (e.g., computing device 114a) separately from the user device 206. The application may be used to discover all control devices such as remote controls in a particular location, such as the residence 200. The user may initiate, via the UI and the application, an command or query directed towards or identifying at least one of the control devices in the residence 200. The command may be initiated via a voice assistant or some other voice-operated device. In this way, the user may verbally request status information such as location information for a particular combination of devices such as media devices and remote controls.

The verbal request may be interpreted by a backend language parsing or speech recognition server (e.g., the computing device 114a, computing device 114b, the computing device 114) to determine an intent of the verbal request. The server may send the verbal request or initiate an appropriate function based on the user communication to the devices identified by the verbal request. The verbal request may use names such as nicknames for identified devices if these names have been set up in advance. The names may be specified by a user. The identified control devices may be identified according to criteria specified by the user via the UI, such as a last used remote control for a particular media device, all remote controls paired to the particular media device, all remote controls of a specific type, all remote controls having a particular signal strength, all remote controls capable of voice control, all remote controls with number keys, all remote controls configured to control another device such as the television 208a, all remote controls having a backlight, all remote controls having a specific identifier such as identifier 108, and/or the like. When the command is received, the user device 206 executing the application may send the command and corresponding configuration, which may be user-specified, to the devices identified by the FMR query. For example, the command may be sent to the media device such as the computing device 114a.

Based on the received command (e.g., FMR command), the computing device 114a may send a signal or message, such as an alert and/or message (e.g., FMR message), to the identified devices such as the remote control 102. The signal may be a check-in message. If the remote control 102 does not respond to the check-in message, the user may be informed that the signal was not received and a response was missed via the application executed via the computing device 114a, and/or on the user device 206. If the control device 102 responds to the check-in message, the control device 102 may begin determining location information associated with the control device 102, such as by signaling and evaluating indicia of its location. After the control device 102 determines its location information, the control device 102 may transmit the status of this location information to the user device 206. In this way, the user may be informed of location information corresponding to each of the responsive devices identified according to the user's FMR query. The location information may also be output by a media device paired to the control device 102, such as via audio feedback from a speaker of the media device or displaying UI messages on a display of the media device. The user may use the location information to search for the control device 102 and pick up the control device 102 if it is successfully found. For example, the application may provide details or hints to the user about the location of the control device 102.

For example, the application may output a message indicating "analysis shows that your remote could be in a drawer in the living room" so that the user may be assisted in real-time while looking for the lost control device 102. If the user locates the lost control device 102, the user may use voice control functionality of the user device 206 or the computing device 114a to audibly indicate that the user has found the lost control device 102. The command (e.g., FMR command) may also "time out" on the user device 206, after which it may be assumed the user has found the lost control device 102, or the user may initiate a new command. For example, the application may implement a smart assistant to assist the user, such as a voice-controlled chat bot with access to location information of the lost control device 102.

The configuration setting may specify parameters of the various modalities used by the control device 102. For example, for the vibration modality 404, the user may specify a particular vibration pattern for the control device 102. For example, a vibration motor of the control device 102 may be activated by the flow of current to produce rapid rotation in a manner that causes the control device 102 to vibrate according to the vibration pattern. For example, the vibration pattern may specify a number of vibrations, a rate of vibrations, an intensity of vibrations, and/or the like. The vibration patter may be user-specific or specified by a user of the control device. The vibration pattern may be manufacturer specific or defined during manufacture. For example, the vibration pattern may be dynamically determined based on a discovered status of the control device 102, such as an adjustment to a higher intensity vibration pattern based on a light-sensing signature being indicative of the control device 102 being in an enclosed space. The higher intensity vibration pattern may more effectively enable the control device 102 to verify that it is actually in an enclosed space. A response or feedback to this vibration pattern may be detected by a motion detection component of the control device 102, such as an accelerometer.

The accelerometer may transition into a sensitive state to clearly measure the movement of the control device 102 while executing the vibration pattern. The response may be used to determine a vibration sensing signature for identifying location information of the control device 102. For example, for the light modality 406, the user may specify whether a backlight such as light emitting diodes (LEDs) should be flashed. Whether the LEDs are flashed may also be a dynamic option in which the decision to flash the LEDs is decided dynamically, such as in real time. For example, the decision to flash may be based on a time of day or based on feedback from a light sensor of the control device 102. The application may suggest or predict whether the LEDs should be flashed based on the user's preferences or needs. For example, information regarding the user's current accessibility configuration may be input to the user device 206 or the computing device 114a and be used by the application to determine whether flashing LEDs would be helpful given the user's accessibility configuration (e.g., whether flashing LEDs would cause the user to become nauseous given accessibility considerations). For example, for the sound modality 408, the user may specify a type of sound, such as sounds within a particular frequency range. The particular frequency range may be a certain range that hearing disabled user are more readily able to hear.

In addition to accessible accommodating targeted sounds, the user may select dynamic sounds based on the discovered status of the control device 102, such as a selection of a thunder sound if the control device 102 is predicted to be located on a harder exposed surface (e.g., based on vibration analysis) because the thunder sound is more effective for propagation in the open air environment of the harder exposed surface. The user may select different sounds for each selectable device, such as using a unique or different sound for the control device 102 that distinguishes the control device 102 from other selectable devices such as other remote controls at the user's location. The sound configuration setting may enable to the user to select a duration and volume of a sound. The sound configuration setting may also provide a library of sounds for a speaker of the control device 102 to play, such as provided by the application. The library of sounds may include songs, types of sounds, ambient noises, ringtones, and/or the like. For example, for the electromagnetic signal modality 410, the user may specify what type of electromagnetic signal is sent by the control device 102 such as an RF broadcast signal, which media devices receives the electromagnetic signal, what signal strengths are used for triangulation and/or the like. For example, for the camera or microphone modality 412, the user may specify which camera to use (e.g., local or remotely located camera), how often the control device 102 should power on the microphone, the usage range of the camera and microphone, when camera and microphone analysis should be used, and/or the like. The user may also configure settings specifying a frequency of check-in by control devices such as the control device 102 with corresponding devices being controlled. For example, the user may set a parameter indicating that every ten minutes, every hour, every couple of hours or the like, the control device 102 will transition into an active state and send a check-in message to an computing device that the control device 102 is configured to control. The parameter may be a periodicity parameter that specifies how often the control device 102 wakes up.

The user may select a dynamic configuration setting in which the frequency that the control device 102 wakes up depends on how frequently or infrequently the control device 102 has been lost. Because the control device 102 may be required to be in the active state to receive a request to determine its location information, it may be more efficient for control devices that are more frequently lost to be more frequent in the active state. For example, metadata in the database (e.g., database 119) may indicate how often the control device 102 has historically been lost. The metadata may comprise an indication of a quantity (e.g., number of instances) that an instruction to determine location information of the control device 102 was received, such as from a user device of the user. The periodicity parameter of a power cycle of the control device 102 may be adjusted based on the quantity associated with the instruction was received. In this way, the periodicity may be increased for remote controls that are frequently lost (e.g., the quantity associated with the instructions was received is relatively high) and the periodicity may be decreased (e.g., the quantity is relatively low) for remote controls that are infrequently lost. Based on the adjusted periodicity, it may be determined how often and when the control device 102 is in an active state. The user may also configure the frequency of check-in settings based on power consumption. For example, the aggressiveness of the power cycle (e.g., how high the periodicity parameter is set at) may be determined based on power consumption considerations such as battery life, voltage, battery drain rate, quantity and quality of user interaction, time of day and/or the like.

The user may configure the control device 102 to consider these power consumption considerations to determine the periodicity parameter. For example, higher capacity batteries of remote controls may enable those remote controls to check in more frequently with a higher periodicity parameter. Similarly, batteries that are more resistant to voltage drops on RF signal transmissions may be configured with the higher periodicity parameter. For example, the periodicity parameter may be dynamically determined by a voltage curve of the control device 102. The type of battery or high rate of voltage drop indicated by the voltage curve may be used to set a lower periodicity parameter. For example, the time of day such as 2 pm on a weekday may be used to determine that the periodicity parameter should be adjusted downwards at that time because it is less likely that the user will be using the control device 102. For example, the periodicity parameter may be adjusted upwards if a motion detection mechanism such as an accelerometer of the control device 102 or metadata indicates that the control device 102 is frequently moved. This frequent movement may be reflective of increased user interaction with the control device 102, such as depending on how often and where the control device 102 is moved to. The higher the periodicity parameter, the quicker the control device 102 responds to an command, but the higher the power consumption will be, such as a higher usage of a battery of the control device 102.

The user may configure the control device 102 to specify how often location analysis performed by the control device 102 is output, such as being displayed on a UI of the user device. For example, the determined location of the control device 102 may be output daily. The user may configure a setting specifying whether an command (e.g., FMR command) sent to a media device such as an computing device or television should be treated as an implicit instruction to power on the media device. The user-configured settings may be set up when the application is being set up such as being installed on the user device or it may be set up when an command is triggered such as by prompting the user to select configurable settings. The user-configured settings may be predicted, such as by the application based on other user settings.

For example, the application may set application configuration settings based on settings used for other devices in the particular location such as accessibility settings, closed captioning settings, text-to-speech settings of a television. The currently selected application configuration settings may be pushed, such as by a server (e.g., computing device 114), to the user device as a permanent state or may be sent to the user device every time an command is sent. The application configuration settings may include a permanent configuration and a temporary or dynamic configuration. The dynamical configuration settings may be determined by a hierarchical mechanism that controls a current command configuration and a permanent state configuration. This way, the current command configuration may be adjusted based on dynamic factors such as the time of day, level of ambient light in the user's location, and/or the like.

Figure 5:
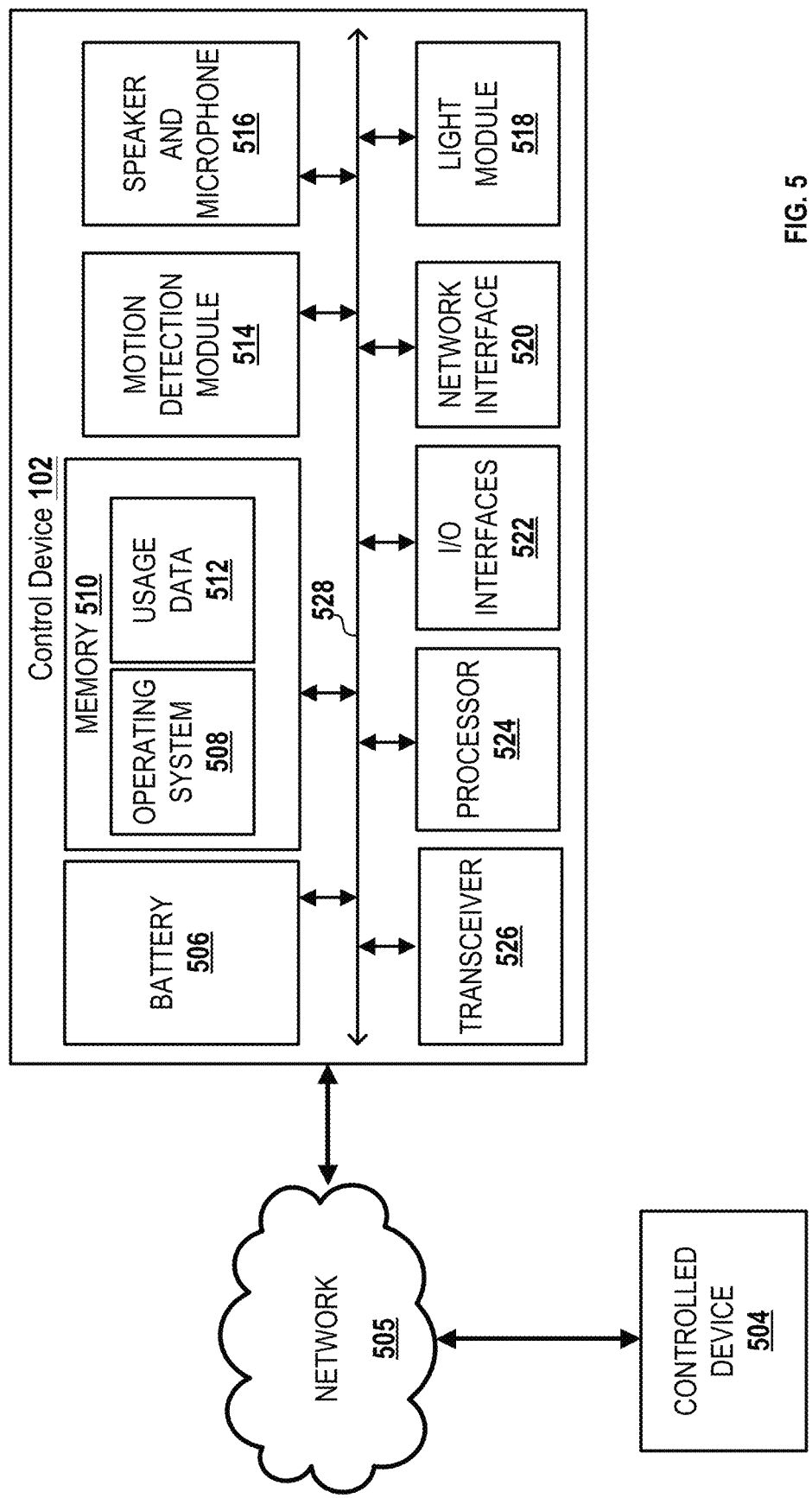
FIG. 5 shows an example remote control.

FIG. 5 illustrates various aspects of an example control device 102 related to the present methods and systems. The control device 102 may be a smart control device. The control device 102 may be in communication with a network 505, such as for Internet access. The control device 102 may be configured to control a controlled device 504, via the network 505. The control device 102 may be configured to control directly, such as via an infrared connection, Bluetooth® connection, short range wireless connection, radio frequency (RF) connection, and/or the like. The controlled device 504 may be a media device such as a television, STB, and/or the like. The control device 102 may also be connected to a database or cloud computing storage (not shown) via the network 505 so that a list of the devices in a location (e.g., residence 200) are stored. An identity or name indicative of the respective location of each device on the list of the devices may be assigned and stored.

The control device 102 may be powered by a battery 506. Parameters such as battery life, voltage, battery drain rate related to the battery 506 may be used to determine a power cycle of the control device 102, such as a periodicity of the power cycle. The control device 102 may comprise a memory 510 including an operating system 508 and usage data 512. The operating system 508 may execute or operate an application for managing all content related devices in a location, such as the residence 200. The operating system 508 may execute the application and other programs for rendering the application on a UI of a user device such as user device 206. The usage data 512 may comprise historical data such as historical data related to previously initiated commands. For example, the usage data 512 may comprise a historic record of when and the result of previously initiated commands. The usage data 512 may be used to inform the user when the control device 102 receives another command. For example, the control device 102 may use the usage data 512 to output a message indicating or to verbally indicate to the user that "the last five time you looked for this remote, it was stuck in a sofa." This way, the control device 102 may use the usage data 512 to inform the user where the control device 102 has historically been lost.

For example, control device 102 may use the usage data 512 to indicate that the control device 102 has previously been carried off to another room in the residence 200 or has been configured to control (e.g., paired with) another device by another user. The usage data 512 may also be stored in a cloud computing system. For example, a cloud computing memory of the cloud computing system may comprise a global pairing table indicative of all remote controls in the residence 200 and what media devices they are paired to. The global pairing table may be updated as various remote controls are added or pairings between remote controls and media devices change. A copy of the global pairing table may be stored in local storage of every media device or device in the residence 200. Updates or changes to devices or pairings may be pushed as updates to the local copies of the global pairing in the corresponding local storage when it is determined that a state of the global pairing table has changed. For example, the state of the global pairing table may change when the user installs a new remote control or changes an existing pairing of remote control from one media device to another media device.

The motion detection module 514 of the control device 102 may interact with a camera, another sensor (e.g., motion sensor), sensory input, or combinations thereof to assess whether the user has changed a device pairing after moving a device from one portion of the residence 200 to another portion. For example, the camera may send a signal to the motion detection module 514 indicative of the user carrying the control device 102 and moving from a living room to a bedroom. The user may be changing the pairing of the control device 102 from an computing device in the living room to an computing device in the bedroom. For example, the motion detection module 514 may determine based on vibration analysis that the control device 102 has been moved from a sofa in the living room to a rigid table in the bedroom. The motion detection module 514 may comprise an accelerometer, such as an accelerometer in a detection sensitive state. For example, the control device 102 may actuate its vibration motor to vibrate, such as according to a user-configured vibration pattern. The accelerometer may sense feedback to this vibration pattern that the control device 102 may use to determine a vibration sensing signature. The vibration sensing signature may be indicative of the control device 102 being moved for pairing to another media device. For example, the vibration sensing signature may initially have a relatively low amplitude (e.g., based on comparison to a baseline vibration amplitude) because the control device 102 is located in the soft sofa of the living room. Because the sofa or a cushion on the soft is a soft surface that may dampen the response to the vibration of the control device 102, the control device 102 may determine that is located proximate the sofa.

For example, the control device 102 may cause the UI of the user device 206 to output a message suggesting to the user to search under or between sofa cushions. When the control device 102 is moved from the sofa to the rigid table in the bedroom, the vibration sensing signature may change to a relatively higher amplitude due to the more rigid quality of the bedroom table. This way, the control device 102 may determine that it has been moved from the living room to the bedroom and may assume that this move is for pairing the control device 102 to another device located in the bedroom. The accelerometer of the motion detection module 514, another sensor (e.g., motion sensor), sensory input, or combinations thereof may detect this change in the vibration sensing signature. The microphone of the speaker and microphone 516 may be powered on and also communicate with the motion detection module 514, another sensor (e.g., motion sensor), sensory input, or combinations thereof to detect an audio sensing signature of the vibration. The audio sensing signature may be indicative of the control device 102 being moved for pairing to another media device. For example, the audio sensing signature may correspond to an amplitude of auditory feedback to the vibration pattern of the control device 102.

If the control device 102 vibrates against a rigid surface, such as that of a drawer, then the amplitude of auditory feedback will be high such that the auditory feedback will be loud. If the control device 102 vibrates against a soft surface, the amplitude of auditory feedback will be low such that the auditory feedback will be soft. Accordingly, the motion detection module 514, another sensor (e.g., motion sensor), sensory input, or combinations thereof and the microphone 516 may be used to determine when the user moves the control device 102 from the sofa in the living room to the rigid table in the bedroom to change pairing. The speaker of the speaker and microphone 516 may be used to play a sound for determining a sound sensing signature. For example, the response to the played sound may be an amplitude of sound feedback measured by a speaker signal.

A low or minimal speaker signal may correspond to the sound sensing signature indicating that the control device 102 is likely located in or around the sofa in the living room due to the speaker signal being absorbed by a sofa cushion. A medium speaker signal may correspond to the sound sensing signature indicating that the control device 102 is likely on a table. A high or maximum speaker signal may correspond to the sound sensing signature indicating that the control device 102 is likely located on in a drawer in the living room. The played sound may be a sound at a specific frequency such that all configurable devices in the in the residence 200 may be configured to receive the sound via their corresponding microphones.

Each configurable device may send a reporting message, such as to the computing device 114, that indicates whether the specific sound was received and what the corresponding audio signal/sound amplitude is, via its corresponding microphone. The configured (e.g., named) reporting device or the user device may output a verbal indication of the closest device to the played sound to indicate where the control device 102 is likely located. The light module 518 may be used to determine that analyze ambient light. The light module 518 may comprise a backlight or light-emitting mechanism such as LEDs to emit or flash a light such as according to a user-configured pattern. A response to the emitted light and/or ambient light may be sensed by a light sensor of the light module 518 to determine a light-sensing signature. A high quantity of light or burst of light may correspond to the light-sensing signature indicating that the control device 102 is likely located in or around the sofa in the living room due to not much light being sensed by the light sensor. Notably, if the control device 102 is in a sofa, there may be no light detected by the light-sensing sensor due to no light being reflected. A lot of light detected by the light-sensing sensor may indicate that control device 102 because there are surfaces proximate to the control device 102 to reflect light back into the light-sensing sensor. The control device 102 may be stuck in a sofa cushion or immediately under the sofa, so that light is impeded from reaching the light sensor. A low quantity of light may correspond to the light-sensing signature indicating that the control device 102 is likely located on the rigid table in the living room due to less impedance of the light from reaching the light sensor. For example, a lot of ambient light and no change when the backlight LEDs are turned on may indicate that the control device 102 is sitting out in the open. No ambient light and no change when the backlight LEDs are turned on may indicate that the control device 102 is covered by something. No ambient light and an increase in light when the backlight is turned on may indicate that the control device 102 is in a drawer.

The transceiver 526 may be configured to generate and send electromagnetic signals, such as broadcasting RF signals. It may also be determined that the control device 102 has been moved out of the living room and paired to a different media device based on RF signals broadcast by the transceiver 526. For example, a baseline signal strength may be determined based on determining a mean signal strength at a plurality of normal viewing locations, such as a couch (e.g., sofa 212) in front of a television (e.g., television 208*a*), a location in a kitchen where the television is viewable, and the like. The baseline signal strength may be used to interpret a signal sensing signature based on a detected signal strength for the control device 102. For example, the signal strength corresponding to the signal sensing signature may be compared to the baseline signal strength to determine that the control device 102 has been moved. The residence 200 may comprise media devices having RF receiver of the same type as the broadcast RF signals. This way, the transceiver 526 may broadcast RF request signals to all media device RF receivers of the same radio type. The plurality of received signal strengths corresponding to the signals received by the media device RF receivers may be used to infer what room or area of the residence 200 that the control device 102 is located at. If there is a threshold number of media device RF receivers, the location of the control device 102 may be triangulated within the residence 200.

Triangulation via the signal sensing signature(s) may involve the use of parameters such as a time difference of arrival (TDOA), multilateration, phase, and/or the like. As such, the control device 102 may use one or more sensing modalities to determine that it has been moved to another area of the residence 200 and paired to a different media device relative to an existing pairing between the control device 102 and a media device. The application on a UI of the user device 206 may output a message based on analysis of the various sensing signatures, such as a message indicating a current location of the control device 102, a current pairing configuration of the control device 102, that the control device 102 has likely been removed from a room of the residence 200, and/or the like. When the control device 102 is moved to another location and paired with the different media device, the control device 102 may store an indication of this change in pairing in the usage data 512. The remote usage data 512 may be aggregated and analyzed by a remote device, such as the computing device 114. The change in pairing may be achieved by ceasing an existing configuration so that the control device 102 is no longer configured to control the existing paired media device. For example, someone such as the user may instruct the control device 102 to stop its current pairing.

The change in pairing may also be achieved by being overwritten. For example, the currently paired media device may be unaware that the existing pairing with the control device 102 is overwritten by the control device 102 being paired to a different media devices. There may be an option for the control device 102 to control and be paired to multiple media devices such that an additional pairing would not overwrite an existing pairing. If the user initiate an command to a media device (e.g., computing device 114*a*) that was previously controlled by the control device 102, the UI of the user device 206 may output the current location information of the control device 102 such as being located in an office of the residence 200 and an indication that the configuration of control device 102 has changed such that the control device 102 is paired to another media device. The UI may prompt the user for an instruction about whether the user desires to find a control device newly paired to the media device or whether the user desires to reconfigured the control device 102 to once again be paired to the media device (rather than the another media device). When the control device 102 is determined to be lost such as based on initiation of an command identifying the control device 102, the application executed on the UI of the user device 206 may provide an option for the user to borrow another control device to substitute for the control device 102. For example, the user may initially fail to find the lost control device 102.

For example, the user may select, via the UI, an option to change the pairing of an alternate control device so that the alternate control device is configured to control the media device previously paired with the lost control device 102. For example, the alternate control device may be a remote control in the office in the residence 200 such that the UI may display a message informing the user such as a message stating "grab the office remote for right now." The alternate remote control may be temporarily paired to the media device such as for a single login session of the application or it may be permanently paired such as until a person reconfigures the alternate remote control. The alternate remote control may be the control device that is physically closest to the location of the user or the location of the media device, for example. A signal strength measurement via the transceiver 526 and corresponding RF receivers may be used to determine which control device is physically closest. The UI of the application may display a list of proximate alternate devices such as a list of alternative remote controls in the vicinity of the user. The list of alternate remote controls may be determined based on the corresponding signal strength measurements of each candidate alternative control device (e.g., all remote controls and smartphones in the residence 200). The list of alternate remote controls may include information such as identifier, media address control address, and/or the like pertaining to remotes on the list.

The user may use the application UI executing on the user device 206 to select the desired alternate remote control of the list. For example, the alternate remote control may be configured to control the media device previously paired with the lost control device 102 without any user input. For example, the alternate remote control may be configured to control the media device based on the user bring the selected alternate remote control in proximity to the media device for pairing. The alternate remote control may be paired to a network address such as a MAC address of the media device. For example, the alternate remote control may be configured to send signals exclusively to the MAC address of the media device. The alternate remote control may be permanently configured or temporarily configured based on specified criteria. For example, the specified criteria may be when an application login session, a certain quantity of application login session ends, the user sends a command indicating that the pairing of the alternate remote control should cease, and/or the like. Configuring the alternate remote control may cause the pairing between the lost control device 102 and the media device to be overwritten or terminated.

The lost control device 102 may be considered lost because the control device 102 is not responsive to a command from the user device 206, the media device configured to be controlled by the control device 102, or the media device via the user device 206. For example, the control device 102 may not respond to a check message from the media device or the user device 206. If the control device 102 does not respond, the media device may retrieve and/or aggregate the last known state (e.g., status information) of the control device 102, such as by querying a database (e.g., database 119). Based on the retrieval or aggregation, the media device or the UI of the application may output information the last known state information, such as battery level, signal strength, last time used, where an alternative remote control has been used since the failure to check-in, and/or the like. For example, the media device or the UI may output a message that a last reported battery voltage of the control device 102 was low, such as close to no voltage. The low reported battery voltage may be used to infer that battery of the control device 102 has died, for example, which may be output to the user as a message. For example, the media device or the UI may also output a message indicating a quantity of periods that the control device 102 was has been unresponsive.

For example, the control device 102 may be configured to be in an active state and send back a response to a check-in message periodically, such as every 5 seconds, ten minutes, thirty minutes, one hour, or any other time period. If the control device 102 fails to send back a response for a threshold quantity of time periods, then an indication of this failure may be output via the media device or the UI, such as when an command is directed to the control device 102 is received. The control device 102 may be a smart remote control comprising a processor 524. The processor 524 may be a hardware device for executing software, such as that stored in system memory 510. The processor 524 may be any custom made or commercially available processor, a central processing unit (CPU), an auxiliary processor among several processors, a semiconductor-based microprocessor (in the form of a microchip or chipset), an application-specific integrated circuit, a field-programmable gate array, or generally any device for executing software instructions. When the control device 102 is in operation, the processor 508 may be configured to execute software stored within the system memory 510, to communicate data to and from the system memory 510, and to generally control operations of the control device 102 pursuant to the software, such as to send and receive commands for controlling the controlled device 504 and activating functions such as for device location.

The processor 508 may execute software to determine which sensing modalities to use for determining location information of the control device 102. The I/O interfaces 522 may be used to receive user input from, and/or for providing system output to, one or more devices or components. User input may be provided via, for example, a keyboard and/or a mouse. System output may be provided via a display device and/or UI. I/O interfaces 522 may include, for example, a serial port, a parallel port, a Small Computer System Interface (SCSI), an infrared (IR) interface, a radio frequency (RF) interface, and/or a universal serial bus (USB) interface. The network interface 520 may be used to transmit and receive from the control device 102 and/or the controlled device 504 on the network 505. The network interface 520 may include, for example, a 10 BaseT Ethernet Adaptor, a 10 BaseT Ethernet Adaptor, a LAN PHY Ethernet Adaptor, a Token Ring Adaptor, a wireless network adapter (e.g., WiFi, cellular, satellite), or any other suitable network interface device. The network interface 520 may include address, control, and/or data connections to enable appropriate communications on the network 505.

Figure 6:
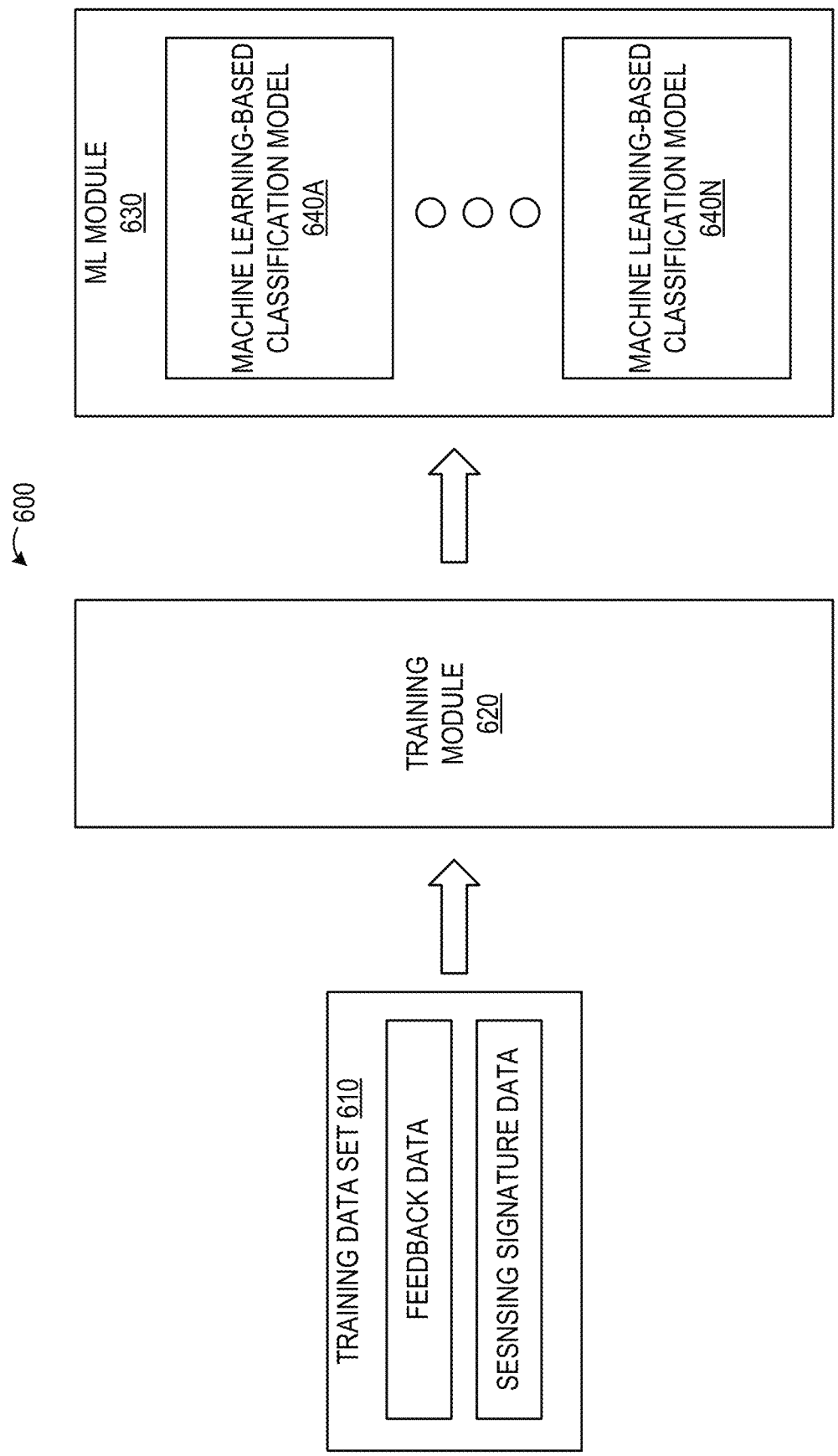
FIG. 6 shows an example training method of a predictive model.

Methods are described herein using machine learning for device location such as via generating a predictive model to predict what location that feedback data (e.g., sensing signatures) correspond to. The methods may be executed via a computing device such as the control device 102, computing device 114, control device 102, or a suitable device of FIGS. 1-5. FIG. 6 shows a flowchart illustrating an example method 600 for a machine learning algorithm that implements a technique for device location. The methods described herein may use machine learning ("ML") techniques to train, based on an analysis of one or more training data sets 610 by a training module 620 and at least one ML module 630 that is configured to predict location information associated with a computing device (e.g., control device 102) based on feedback data and/or sensing signatures. For example, the at least one ML module 630 may be configured to classify the feedback data and/or sensing signatures to a location that the control device 102 may be found at. A user may confirm whether the classification determined by the at least one ML module 630 is correct. For example, the user can input, via a UI of a user device, confirmation that the lost control device 102 was found at the location corresponding to the classified feedback data and/or sensing signatures. This confirmation (e.g., as instances of correct machine learning classification) may be used to adjust the training data sets 610 so that the accuracy of the at least one ML module 630 increases.

The at least one ML module 630 may predict specific locations, objects, time of day and/or the like associated with a predicted location of the lost control device 102. For example, the at least one ML module 630 may predict that the computing device may be found at a bedroom of a location (e.g., residence 200), a sofa (e.g., between cushions of sofa 212), moved by a person departing the residence in the morning after watching television, or the like. The training module 620 and at least one ML module 630 may be components of or integrated into the computing device 114 or another suitable device of FIGS. 1-5. The feedback data and/or sensing signatures may be compared to a threshold to determine the location information of the lost control device 102. For example, a vibration sensing signature that exceeds a vibration threshold may be indicative of a hard wooden material, such as a rigid table 214 in room 1 220. The vibration threshold or other thresholds may be adjusted based on the location predicted by the at least one ML module 630 and/or the confirmation received from the user regarding whether the predicted location is correct. The classification of one or more training data sets 610 by the training module 620 and the at least one ML module 630 may be used to adjust the feedback data or response received from activated functions according to various sensing modalities such as sound, light, and vibration modalities.

Analysis of the one or more training data sets 610 by the training module 620 and the at least one ML module 630 may enable determination or identification of location-specific insights. For example, classification via the at least one ML module 630 may reflect user activity before and after the control device 102 was lost. For example, the at least one ML module 630 may predict that the location of the control device 102 was lost around a sofa (e.g., sofa 212) of the living room because analysis of the one or more training data sets 610 indicates that the user tends to watch television at 6 pm in the living room and move the control device 102 around the sofa 212. The training data set 610 may comprise a set of feedback data and/or sensing signature data. The feedback data may be an amplitude of a speaker signal, quantity of light sensed by a light sensor, RF signal strength, and/or the like. A subset of the feedback data and/or sensing signature data may be randomly assigned to the training data set 610 or to a testing data set. The assignment of data to a training data set or a testing data set may be random, completely random, or none of the above. Any suitable method or criteria (e.g., user provided classifiers) may be used to assign the data to the training or testing data sets, while ensuring that the distributions of yes and no labels are somewhat similar in the training data set and the testing data set.

The analysis of the training data set 610 may be used to refine the machine learning algorithm and/or change the determination of the location information of the control device 102 based on different patterns such as user interaction patterns. For example, the patterns may indicate that the lost control device 102 is more likely to be found in a drawer (e.g., drawer 216) shortly before a holiday such as Thanksgiving because it is more likely the user will be cleaning at their location (e.g., the residence 200). For example, the patterns may indicate that the lost control device 102 is more likely to be in the sofa 212 rather than a flat surface such as a table during prime time. For example, the patterns may indicate that the lost control device 102 is less likely to be moved out of a room if it is not a cleaning day (e.g., no cleaning service is coming to clean the residence 200). This way, detection of patterns via analysis and classification of the training data set 610 may be used to increase or decrease the likelihood that the lost control device 102 is found in a particular location.

The data of the training data set 610 may be determined based on metadata associated with lost devices and/or commands sent by users that may be retrieved from a database such as the database 119. The training data set 610 may be provided to the training module 620 for analysis and for determination of a feature set. The determination of the feature set may be determined based on feedback data, sensing signatures, parameters of activated functions of devices, and/or the like. The feature set may be determined based on the corresponding modality or modalities used such that the size of the feature set is a proper fit. The feature set may comprise suggested or recommended words or phrases as well as associated trick play actions to be applied. The feature set may be determined by the training module 620 via the ML module 630. For example, the training module 620 may train the ML module 630 by extracting the feature set from a plurality of locations and/or sensing signatures (e.g., labeled as yes and thus a potential candidate location for search for a lost device according to a corresponding sensing signature) and/or another plurality of locations and/or sensing signatures (e.g., labeled as no and thus not a candidate location) in the training data set 610 according to one or more feature selection techniques.

The training module 620 may train the ML module 630 by extracting a feature set from the training data set 610 that includes statistically significant features of positive examples (e.g., labeled as being yes) and statistically significant features of negative examples (e.g., labeled as being no). The training module 620 may extract a feature set from the training data set 610 in a variety of ways. The training module 620 may perform feature extraction multiple times, each time using a different feature-extraction technique. For example, the feature sets generated using the different techniques may each be used to generate different machine learning-based classification models 640. For example, the feature set with the highest quality metrics may be selected for use in training.

The training module 620 may use the feature set(s) to build one or more machine learning-based classification models 640A-640N that are configured to indicate whether a portion of the residence 200 corresponding to sensing signature(s) and/or feedback data is a candidate or suggested point for portion of the residence 200 to search for the lost control device 102. The one or more machine learning-based classification models 640A-640N may also be configured to indicate device parameters (e.g., battery parameters, power cycle parameters, etc.) and other information associated with the predicted location of the lost control device 102, such as proximate alternative devices, pairing information, and/or the like. Specific features of the feature set may have different relative significance in predicting location information of the lost control device 102.

The training data set 610 may be analyzed to determine any dependencies, associations, and/or correlations between features and the yes/no labels in the training data set 610. The identified correlations may have the form of a list of features that are associated with different yes/no labels. The term "feature," as used herein, may refer to any characteristic of an item of data that may be used to determine whether the item of data falls within one or more specific categories. By way of example, the features described herein may comprise candidate locations, device configuration/pairing information, movement information (e.g., device moved from one room to another room), and/or the like. A feature selection technique may comprise one or more feature selection rules. The one or more feature selection rules may comprise a feature occurrence rule. The feature occurrence rule may comprise determining which features in the training data set 610 occur over a threshold number of times and identifying those features that satisfy the threshold as features.

A single feature selection rule may be applied to select features or multiple feature selection rules may be applied to select features. The feature selection rules may be applied in a cascading fashion, with the feature selection rules being applied in a specific order and applied to the results of the previous rule. For example, the feature occurrence rule may be applied to the training data set 610 to generate a first list of features. A final list of features may be analyzed according to additional feature selection techniques to determine one or more feature groups (e.g., groups of features that may be used to predict trick play operation automation points). Any suitable computational technique may be used to identify the feature groups using any feature selection technique such as filter, wrapper, and/or embedded methods. One or more feature groups may be selected according to a filter method. Filter methods include, for example, Pearson's correlation, linear discriminant analysis, analysis of variance (ANOVA), chi-square, combinations thereof, and/or the like. The selection of features according to filter methods are independent of any machine learning algorithms. Instead, features may be selected on the basis of scores in various statistical tests for their correlation with the outcome variable (e.g., yes/no).

As another example, one or more feature groups may be selected according to a wrapper method. A wrapper method may be configured to use a subset of features and train a machine learning model using the subset of features. Based on the inferences that are drawn from a previous model, features may be added and/or deleted from the subset. Wrapper methods include, for example, forward feature selection, backward feature elimination, recursive feature elimination, combinations thereof, and the like. For example, forward feature selection may be used to identify one or more feature groups. Forward feature selection is an iterative method that begins with no feature in the machine learning model. In each iteration, the feature which best improves the model is added until addition of a new variable does not improve the performance of the machine learning model.

For example, backward elimination may be used to identify one or more feature groups. Backward elimination is an iterative method that begins with all features in the machine learning model. In each iteration, the least significant feature is removed until no improvement is observed on the removal of features. Recursive feature elimination may be used to identify one or more feature groups. Recursive feature elimination is a greedy optimization algorithm that aims to find the best performing feature subset. Recursive feature elimination repeatedly creates models and keeps aside the best or the worst performing feature at each iteration. Recursive feature elimination constructs the next model with the features remaining until all the features are exhausted. Recursive feature elimination then ranks the features based on the order of their elimination.

As a further example, one or more feature groups may be selected according to an embedded method. Embedded methods combine the qualities of filter and wrapper methods. Embedded methods include, for example, Least Absolute Shrinkage and Selection Operator (LASSO) and ridge regression which implement penalization functions to reduce overfitting. For example, LASSO regression performs L1 regularization which adds a penalty equivalent to the absolute value of the magnitude of coefficients and ridge regression performs L2 regularization which adds a penalty equivalent to the square of the magnitude of coefficients.

After the training module 620 has generated a feature set(s), the training module 820 may generate a machine learning-based classification model 640 based on the feature set(s). A machine learning-based classification model may refer to a complex mathematical model for data classification that is generated using machine-learning techniques. In one example, the machine learning-based classification model 640 may include a map of support vectors that represent boundary features. By way of example, boundary features may be selected from, and/or represent the highest-ranked features in, a feature set. The machine learning-based classification model 640 may be a supervised machine learning model based on a plurality of classifiers provided by a plurality of users.

The training module 620 may use the feature sets determined or extracted from the training data set 610 to build a machine learning-based classification model 640A-640N for each classification category (e.g., yes, no). In some examples, the machine learning-based classification models 640A-640N may be combined into a single machine learning-based classification model 640. Similarly, the ML module 630 may represent a single classifier containing a single or a plurality of machine learning-based classification models 640 and/or multiple classifiers containing a single or a plurality of machine learning-based classification models 640. A classifier may be provided by a user according to user configuration settings, such as settings related to an activated function of the control device 102 and a type of feedback data and/or sensing signature.

The features may be combined in a classification model trained using a machine learning approach such as discriminant analysis; decision tree; a nearest neighbor (NN) algorithm (e.g., k-NN models, replicator NN models, etc.); statistical algorithm (e.g., Bayesian networks, etc.); clustering algorithm (e.g., k-means, mean-shift, etc.); neural networks (e.g., reservoir networks, artificial neural networks, etc.); support vector machines (SVMs); logistic regression algorithms; linear regression algorithms; Markov models or chains; principal component analysis (PCA) (e.g., for linear models); multi-layer perceptron (MLP) ANNs (e.g., for non-linear models); replicating reservoir networks (e.g., for non-linear models, typically for time series); random forest classification; a combination thereof and/or the like. The resulting ML module 630 may comprise a decision rule or a mapping for each feature to assign trick mode automation status.

In an embodiment, the training module 620 may train the machine learning-based classification models 640 as a convolutional neural network (CNN). The CNN comprises at least one convolutional feature layer and three fully connected layers leading to a final classification layer (softmax). The final classification layer may finally be applied to combine the outputs of the fully connected layers using softmax functions as is known in the art.

The feature(s) and the ML module 630 may be used to predict the location of the lost control device 102. For example, the prediction result for each content item includes a likelihood that feedback data and/or sensing signatures should be classified as corresponding to a type of object or area associated with location information of the lost control device 102. For example, a prediction result for feedback data and/or sensing signatures may be that the control device 102 is predicted to be lost inside a sofa based on a vibration sensing signature. The prediction result may have a confidence level that corresponds to a likelihood or a probability that feedback or sensing signatures are classified accurately. The confidence level may be a value between zero and one, and it may represent a likelihood that the feedback or sensing signatures is indicative of an object or space within the residence 200.

For example, when there are two statuses (e.g., yes and no), the confidence level may correspond to a value p, which refers to a likelihood that a particular feedback or sensing signature belongs to the first status (e.g., yes). In this case, the value 1−p may refer to a likelihood that the particular feedback or sensing signature belongs to the second status (e.g., no). In general, multiple confidence levels may be provided for each particular instance of feedback or sensing signature in the testing data set and for each feature when there are more than two statuses. A top performing feature may be determined by comparing the result obtained for each feedback or sensing signature with the known yes/no status, based on the user confirmation data indicative of whether the predicted location information of the control device 102 was accurate. The predicted location information known to be accurate may comprise a location or object that a user has specifically approved or explicitly indicated is where the user found the control device 102. In general, the top-performing feature will have results that closely match the known historically accurate classifications of location information based on feedback or sensing signature or closely match where the user has previously located the control device 102 in similar situations. The top-performing feature(s) may be used to predict additional patterns or indications of what location information that feedback or sensing signature corresponds to. For example, a new correlation between a time and a space in the residence 200 and feedback data may be determined. The new correlation may be provided to the ML module 630 which may, based on the top-performing feature(s), improve classification of new feedback data or classification information based on location as either a candidate location (yes) or not a candidate location (no).

Figure 7:
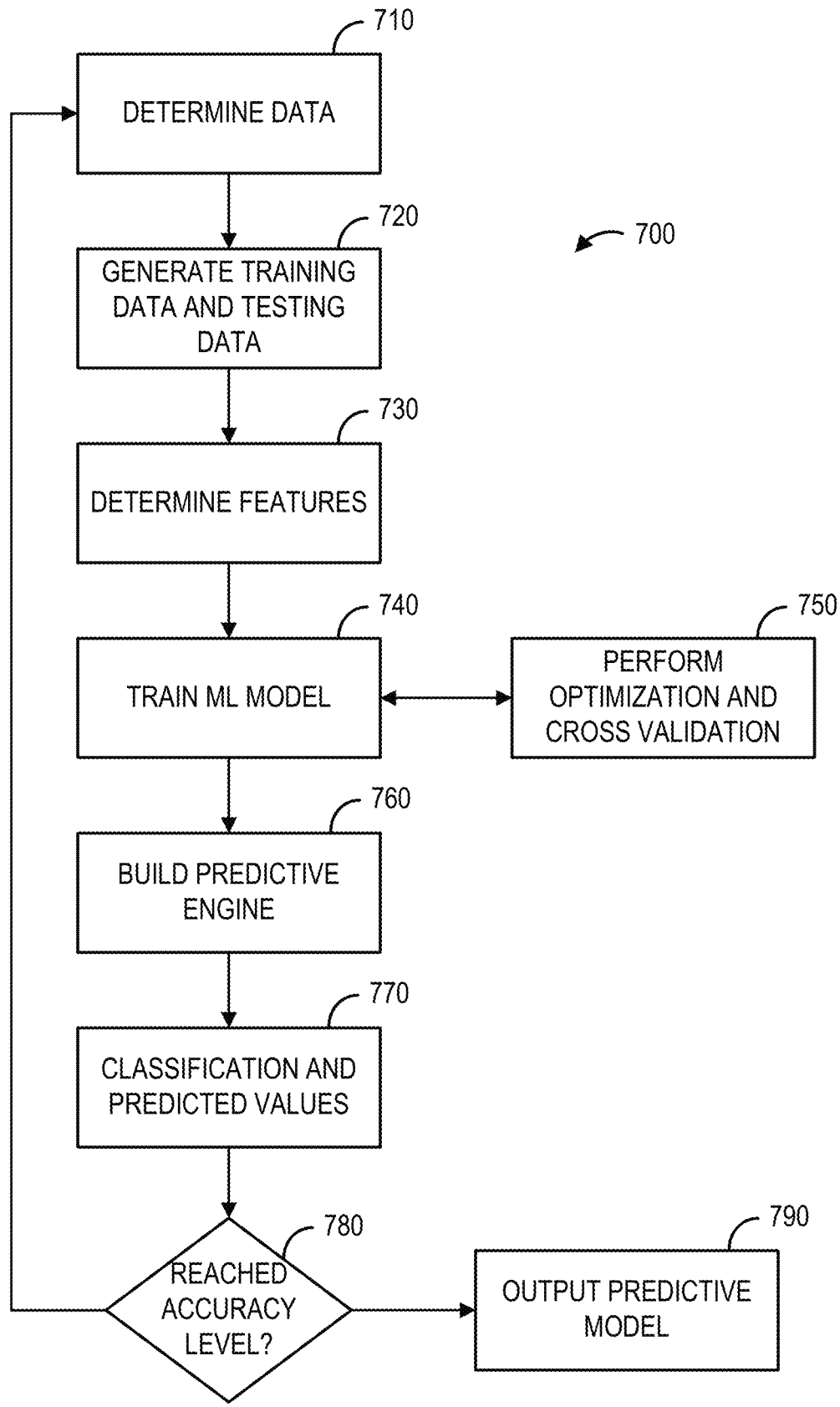
FIG. 7 shows example features of a predictive model.

FIG. 7 is a flowchart illustrating an example training method 700 for generating the ML module 630 using the training module 620. The training module 620 can implement supervised, unsupervised, and/or semi-supervised (e.g., reinforcement-based) machine learning-based classification models 640. The method 700 illustrated in FIG. 7 is an example of a supervised learning method; variations of this example of training method are discussed below, however, other training methods can be analogously implemented to train unsupervised and/or semi-supervised machine learning models.

The training method 700 may determine (e.g., access, receive, retrieve, etc.) feedback data and sensing signature data associated with an activated function of a lost device at step 710. The feedback data and sensing signature data may comprise a characterization of a response to the activated function according to one or more sensing modalities. The labels may correspond to candidate location status (e.g., yes or no) if the label corresponds to a place or object is a candidate location or otherwise indicative of location information of the lost device.

The training method 700 may generate, at step 720, a training data set and a testing data set. The training data set and the testing data set may be generated by randomly assigning labeled sets of feedback data and sensing signature data to either the training data set or the testing data set. In some implementations, the assignment of labeled sets of feedback data and sensing signature data as training or testing data may not be completely random. For example, a majority of the labeled set of feedback data and sensing signature data may be used to generate the training data set. For example, 75% of the labeled set of feedback data and sensing signature data may be used to generate the training data set and 25% may be used to generate the testing data set. In another example, 80% of the labeled set of feedback data and sensing signature data may be used to generate the training data set and 20% may be used to generate the testing data set.

The training method 700 may determine (e.g., extract, select, etc.), at step 730, one or more features that can be used by, for example, a classifier to differentiate among different classification of trick play automation status (e.g., yes vs. no). For example, the training method 700 may determine a set of features from the labeled set of feedback data and sensing signature data. For example, a set of features may be determined from a labeled set of feedback data and sensing signature data that is different than the labeled set of feedback data and sensing signature data in either the training data set or the testing data set. In other words, the labeled set of feedback data and sensing signature data may be used for feature determination, rather than for training a machine learning model. Such labeled set of feedback data and sensing signature data may be used to determine an initial set of features, which may be further reduced using the training data set. By way of example, the features described herein may comprise physical objects, places, portions of places (e.g., rooms), communicative pairings, and/or the like.

The training method 700 may train one or more machine learning models using the one or more features at step 740. In one example, the machine learning models may be trained using supervised learning. In another example, other machine learning techniques may be employed, including unsupervised learning and semi-supervised. The machine learning models trained at 740 may be selected based on different criteria depending on the problem to be solved and/or data available in the training data set. For example, machine learning classifiers can suffer from different degrees of bias. Accordingly, more than one machine learning model can be trained at 740, optimized, improved, and cross-validated at step 750.

The training method 700 may select one or more machine learning models to build a predictive model at 760. The predictive model may be evaluated using the testing data set. The predictive model may analyze the testing data set and generate predicted location information corresponding to the feedback data and sensing signature data of the testing data set at step 770. Predicted trick play automation status statuses may be evaluated at step 780 to determine whether such values have achieved a desired accuracy level. Performance of the predictive model may be evaluated in a number of ways based on a number of true positives, false positives, true negatives, and/or false negatives classifications of the feedback data and sensing signature data indicated by the predictive model.

For example, the false positives of the predictive model may refer to a number of times the predictive model incorrectly classified feedback data and sensing signature data as indicative of location information that was in reality not location information that should be recommended to a user or was not accepted by the user as where to find the lost device. Conversely, the false negatives of the predictive model may refer to a number of times the machine learning model classified feedback data and sensing signature data as not indicative of location information when, in fact, the location information did correspond to a location where the user would fine the lost device. True negatives and true positives may refer to a number of times the predictive model correctly classified a location or physical object as being where the lost device may be found or not as a location to find the lost device. Related to these measurements are the concepts of recall and precision. Generally, recall refers to a ratio of true positives to a sum of true positives and false negatives, which quantifies a sensitivity of the predictive model. Similarly, precision refers to a ratio of true positives a sum of true and false positives. When such a desired accuracy level is reached, the training phase ends, and the predictive model (e.g., the ML module 630) may be output at step 790; when the desired accuracy level is not reached, however, then a subsequent iteration of the training method 700 may be performed starting at step 710 with variations such as, for example, considering a larger collection of feedback data and sensing signature data.

Figure 8:
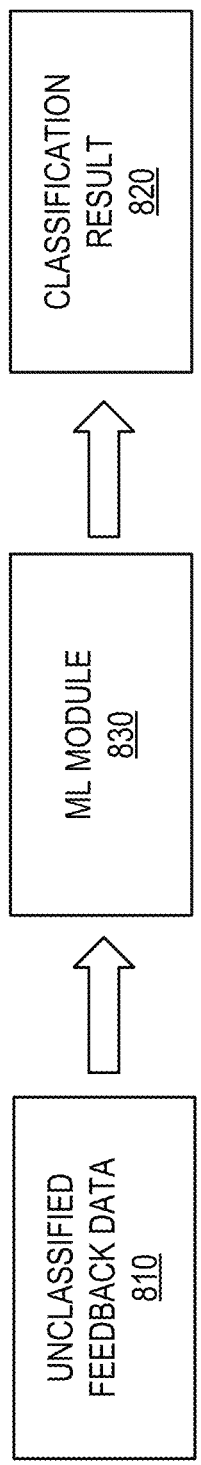
FIG. 8 shows an example method.

FIG. 8 is an illustration of an exemplary process flow for using a machine learning-based classifier to determine whether feedback data and sensing signature data is indicative of location information associated with a lost device (e.g., at a specific place or physical object). As illustrated in FIG. 8, unclassified feedback data 810 (e.g., including sensing signature data) may be provided as input to the ML module 830. The ML module 830 may process the unclassified feedback data 810 and potential places (e.g., a bedroom) or physical objects (e.g., the surface of a table) using a machine learning-based classifier(s) to arrive at a classification result 820.

The classification result 820 may identify one or more characteristics of the feedback data 810, such as whether the feedback data 810 indicates a type of place or object where a user may search for or find the lost device. For example, the classification result 820 may identify that the feedback data 810 means or predicts that the user should search for the device in between cushions of a sofa, search for the device in a sock drawer, and/or the like. The classification result 820 may identify, based on the feedback data 810, the device is a control device that was moved to another room to pair with a different controlled device, the last known state of the device prior to a battery of the device becoming depleted of power, the device is in a place with relatively low ambient light, and/or the like.

The ML module 830 may be used to classify, for instances of the feedback data 810, as corresponding to a place or object provided by an analytical model. A predictive model (e.g., the ML module 830) may serve as a quality control mechanism for the analytical model. Before feedback data 810 provided by the analytical model is tested in an experimental setting, the predictive model may be used to test if the provided feedback data 810 would be predicted to be positive for identifying location information of the lost device. In other words, the predictive model may suggest or recommend that a place, object, or other indicia of location according to the feedback data 810 for the user to find the lost device.

Figure 9:
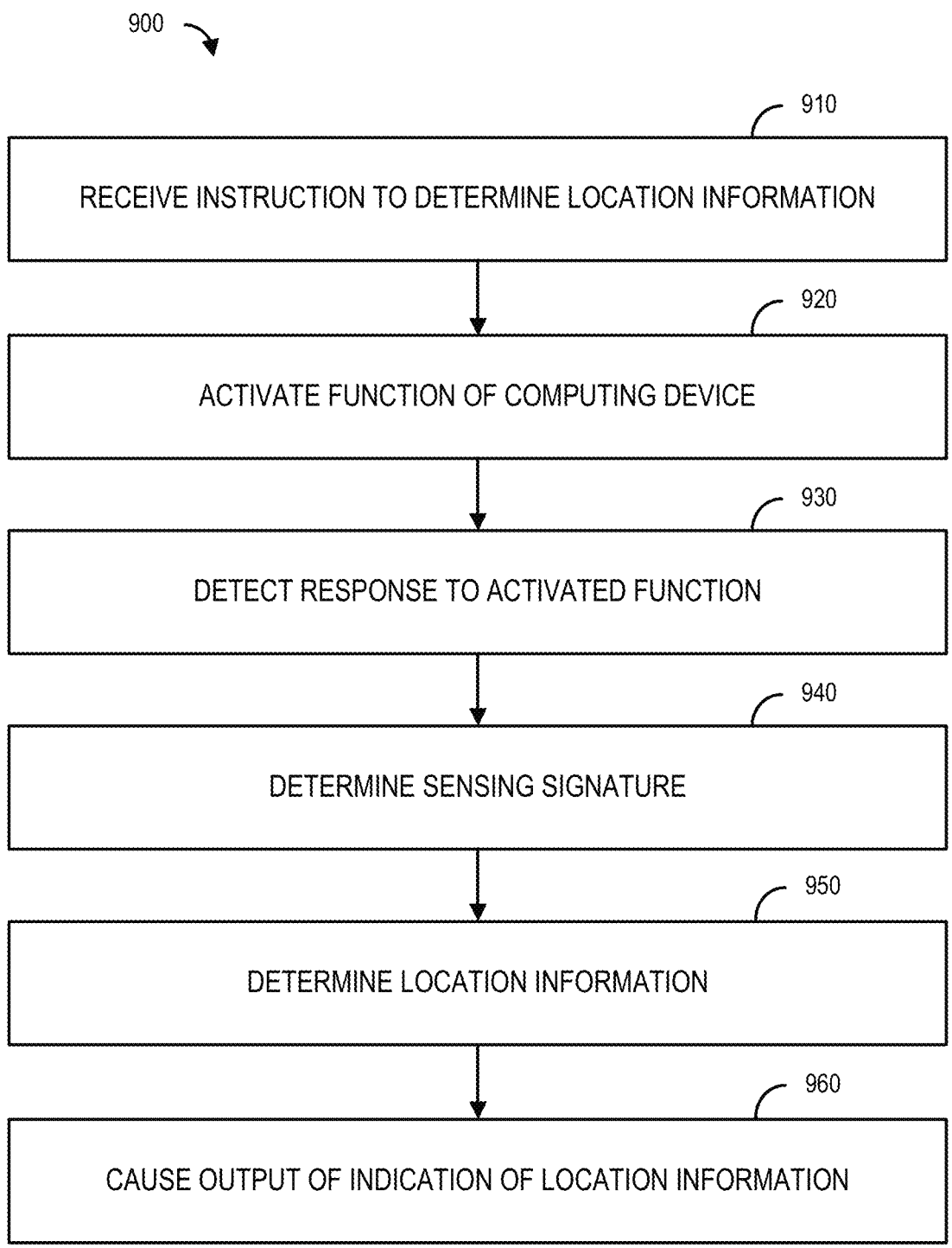
FIG. 9 shows a flowchart of an example method.

FIG. 9 shows a flowchart illustrating an example method 900 for device location. The method 900 may be implemented using the devices shown in FIGS. 1-5. For example, the method 600 may be implemented using a device such as the computing device 102, control device 102, or other suitable device. At step 910, a computing device may receive an instruction to determine location information. The location information may be associated with the computing device. The computing device may receive the instruction from a user device (e.g., user device 206). For example, the computing device may receive a voice query for a location of the computing device. The computing device may comprise a control device. For example, the computing device may receive the instruction based on the computing device being in an active state.

At step 920, the computing device may activate a function of the computing device. The computing device may activate the function based on the instruction. For example, the computing device may activate the function to output a sound within a frequency range. The frequency range may be associated with an accessibility requirement of a user. For example, the computing device may activate the function to output a sound associated with a type of location. For example, the computing device may activate the function to emit a plurality of signals comprising at least one of: a sound signal, a light signal, a wireless signal, a vibration signature, or an electromagnetic signal. At step 930, the computing device may detect a response to the activated function. The response may be detected by a sensor of the computing device. For example, the computing device may detect the response to receive feedback associated with a location of the computing device.

At step 940, the computing device may determine a sensing signature. The sensing signature may be determined based on the response to the activated function. For example, the computing device may determine the sensing signature to determine a change in the response to the activated function. The change may be determined based on spatial or temporal information. The temporal information may comprise a time of a day. The spatial information may comprise at least one of: a quantity of ambient light, a type of surface, an accelerometer parameter, or a room within a building. For example, the computing device may determine the sensing signature to determine at least one of: a sound signature, a light signature, a vibration signature, or an electromagnetic signature. At step 950, the computing device may determine the location information. The location information may be determined based on the sensing signature. For example, the computing device may determine the location information based on the sensing signature being indicative of a characteristic of vibration. The quantity of vibration may be associated with a type of surface. The characteristic of vibration may be a frequency of vibration, magnitude of vibration, pattern of vibration, or various combinations thereof.

For example, the computing device may determine the location information based on the sensing signature being indicative of a light pattern. The light pattern may be associated with a type of surface. For example, the computing device may determine the location information based on the sensing signature being indicative of a signal strength of a wireless signal. The signal strength may be associated with a type of surface. The wireless signal may comprise a radio frequency (RF) signal. For example, the computing device may determine the location information based on the sensing signature being indicative of a sound pattern. The sound pattern may be associated with a type of surface. For example, the computing device may determine the location information to receive a broadcast RF signal. The broadcast RF signal may be received by each receiver of a plurality of receivers. The computing device may determine a plurality of parameters associated with the location information. The plurality of parameters may be determined based on the broadcast RF signals.

At step 960, the computing device may cause output of an indication of the location information. For example, the computing device may cause output of the indication to cause output of an indication of a type of location to search for the computing device. For example, the computing device may cause output of the indication to send a recommendation comprising at least one of: a type of surface, a type of room, or a type of object associated with a predicted location of the computing device. The recommendation may be sent to a user device. For example, the computing device may send location information of the computing device to a set top box. For example, the computing device may determine a type of location to search for the computing device. The type of location may be determined based on metadata and based on a comparison between the sensing signature and a threshold. The location information may comprise the type of location. For example, the computing device may determine an adjustment to the threshold. The adjustment to the threshold may be based on a classifier of a machine learning algorithm.

For example, the computing device may adjust a power cycle of the computing device based on at least one of: a frequency that the computing device has been lost, a quantity of user interaction, a quantity of power consumption, a voltage parameter, a battery drain rate, or a temporal parameter. The computing device may determine, based on adjusting the power cycle, whether the computing device is in an active state. For example, the computing device may determine an alternate computing device. The alternate computing device may be determined based on the instruction. The computing device may be configured to control a second computing device. The computing device may cause output of an option to select the alternate computing device. The computing device may receive a selection of the option. The computing device may configure the alternate computing device to control the second computing device. For example, the computing device may determine a quantity associated with an instruction to determine location information associated with the computing device was received. The computing device may adjust, based on the quantity associated with the instruction was received, a parameter of a power cycle of the computing device. The computing device may determine, based on the adjusted parameter of the power cycle, an active state of the computing device.

Figure 10:
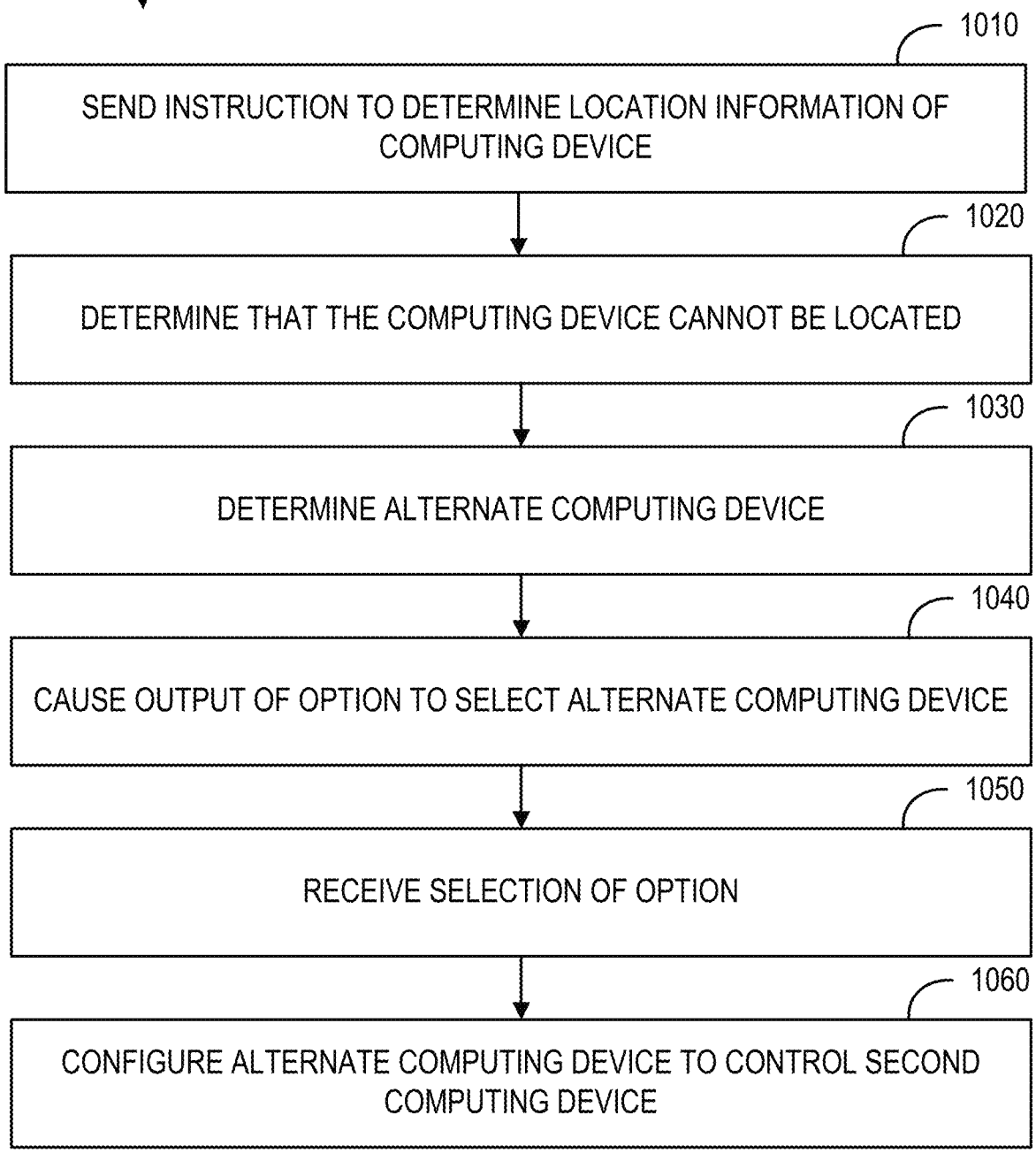
FIG. 10 shows a flowchart of an example method.

FIG. 10 shows a flowchart illustrating an example method 1000 for device location. The method 1000 may be implemented using the devices shown in FIGS. 1-5. For example, the method 1000 may be implemented using a device such as the computing device 114, control device 102, or other suitable devices. At step 1010, a computing device may send an instruction to determine location information of a computing device configured to control a second computing device. For example, the computing device may send the instruction so that the computing device may determine that the computing device is in an active state. For example, the computing device may send the instruction so that the computing device may determine a sensing signature. The sensing signature may comprise at least one of: a sound signature, a light signature, a vibration signature, or an electromagnetic signature. For example, the computing device may send the instruction so that the computing device may determine an adjustment to a threshold. The adjustment to a threshold may be determined based on a machine learning algorithm. The machine learning algorithm may be based on at least one of: vibration analysis, light analysis, sound analysis, signal strength analysis, camera analysis, or microphone analysis.

A user device may receive an indication of a suggested location to search for the computing device. The computing device may receive a request for a location of a plurality of remote controls associated with user specified criteria. The user specified criteria may comprise at least one of: a usage time criteria, a pairing criteria, a remote type criteria, a signal strength criteria, a voice control criteria, a number key criteria, a backlight criteria, or an identifier criteria. At step 1020, it may be determined that the computing device cannot be located. For example, a function may be activated by the computing device. If the activated function fails to satisfy a threshold, the computing device may fail to be located. Any of the described modalities may be used. As an example, a sound may be played to determine a location of the computing device. If the received sound fails to satisfy a threshold (e.g., is too muted, is too far from the pattern, or otherwise), the computing device may be deemed lost.

At step 1020, the computing device may determine an alternate computing device. The alternate computing device may be determined based on sending the instruction or based on the determination that the device has failed to be located. For example, if the sensing signature is not received or fails to satisfy a threshold, even with the adjustment, an alternative computing device may be determined. It should be appreciated that the sensing signature may be determined not received if the sensing signature fails to satisfy a threshold magnitude, indicating that a location of the source of the sensing signature leads to an attenuated sensing signature that is beyond the threshold. For instance, different modalities of the computing device, such as a vibration modality, light modality, sound modality, electromagnetic signal modality, camera modality, or microphone modality may be used to determine a sensing signature based on a response associated with the computing device. For example, a response to a time, type, and quantity of signals emitted by the device may be used by the computing device as feedback to determine the user requested location information. An alternative computing device may be determined if a response from one of the modalities is not received or for other reasons.

For example, the computing device may determine the alternate computing device to determine a plurality of alternate computing devices capable of being paired to the second computing device. The plurality of alternate computing devices comprises a plurality of remote controls. For example, the computing device may determine the alternate computing device to select the alternate computing device from the plurality of alternate computing devices. The alternate computing device may be configured to control a third computing device.

At step 1030, the computing device may cause output of an option to select the alternate computing device. For example, the computing device may cause output of the option to output an indication of a plurality of alternate computing devices located within a threshold distance from computing device. The alternate computing device may be configured to control a third computing device. The computing device may receive an indication that the computing device is found. The computing device may configure, based on the indication that the computing device is found, the alternate computing device to control the third computing device. At step 1040, the computing device may receive a selection of the option. For example, the computing device may receive the selection so that the computing device to receive, via a user interface, a selection of the alternate computing device when the alternate computing device is in proximity to the second computing device. At step 1050, the computing device may configure the alternate computing device to control the second computing device. For example, the computing device may configure the alternate computing device to control the second computing device to pair the alternate computing device with the second computing device.

The computing device may activate a function of the computing device. The function may be activated based on the instruction. The computing device may detect, by a sensor of the computing device, a response to the activated function. The computing device may determine a sensing signature. The sensing signature may be determined based on the response to the activated function. The computing device may determine the location information. The location information may be determined based on the sensing signature. The computing device may cause output of an indication of the location information. The computing device may determine a quantity associated with the instruction was received. The computing device may adjust a parameter of a power cycle of the computing device. The parameter may be adjusted based on the quantity associated with the instruction was received. The computing device may determine the active state of the computing device. The active state may be determined based on the adjusted parameter of the power cycle.

Figure 11:
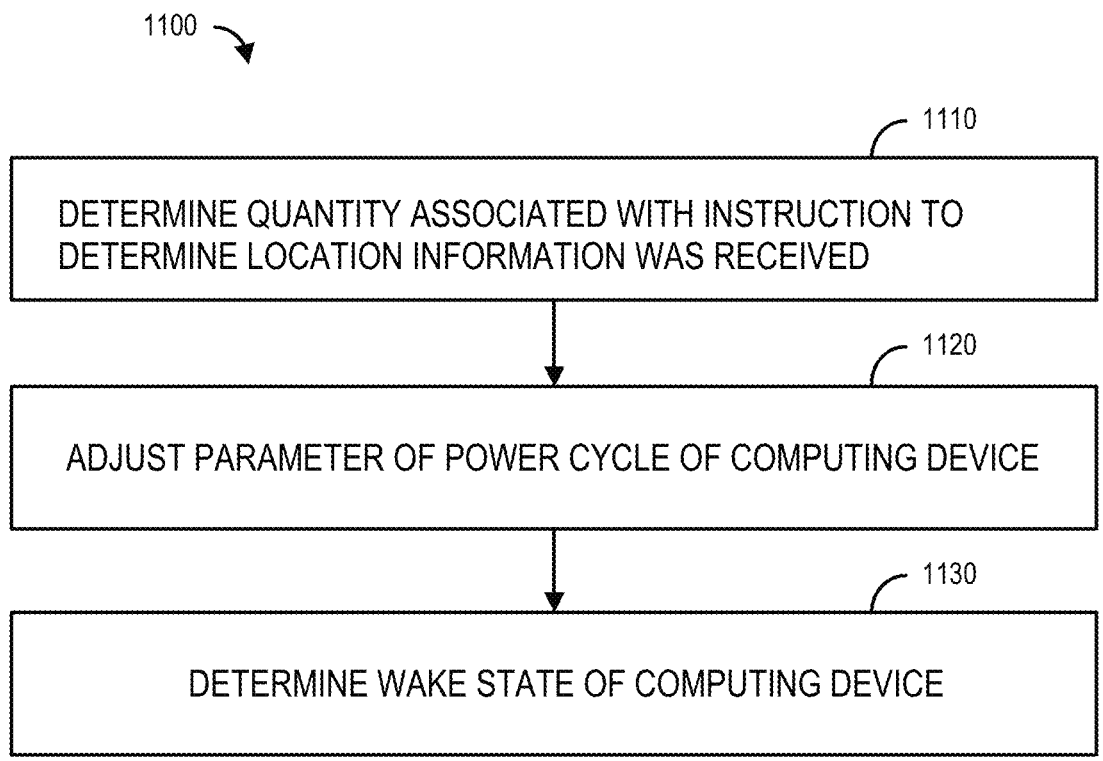
FIG. 11 shows a flowchart of an example method.

FIG. 11 shows a flowchart illustrating an example method 1100 for device location. The method 1100 may be implemented using the devices shown in FIGS. 1-5. For example, the method 1100 may be implemented using a device such as the computing device 102, control device 102, or other suitable devices. At step 1110, a computing device may determine a quantity associated with an instruction to determine location information associated with a second computing device was received. For example, the computing device may determine the quantity to determine a classification of the second computing device. The second computing device may comprise a remote control. For example, the computing device may determine the quantity to determine a frequency that the second computing device is lost. For example, the computing device may determine the quantity to determine the quantity associated with the instruction was received. The quantity may be determined based on metadata received from a database. The computing device may receive, from a user device, a voice query for the location information of the computing device. The computing device may determine, based on the voice query, whether the second computing device is in the active state. The second computing device may be configured to receive signals in the active state. The computing device may send, to a set top box, the location information of the second computing device. The computing device may determine a sensing signature. The sensing signature may comprise at least one of: a sound signature, a light signature, a vibration signature, or an electromagnetic signature.

At step 1120, the computing device may adjust a parameter of a power cycle of the second computing device. The parameter may be adjusted based on the quantity associated with the instruction was received. For example, the computing device may adjust the parameter so that the computing device may determine whether the quantity associated with the instruction was received is above a threshold. The computing device may increase based on the quantity associated with the instruction was received being above the threshold, a periodicity of the power cycle. The periodicity may define when the second computing device transitions from a sleep state to an active state. The computing device may decrease, based on the quantity associated with the instruction was received being below the threshold, the periodicity of the power cycle. For example, the computing device may adjust the parameter based on at least one of: a frequency that the computing device has been lost, a quantity of user interaction, a quantity of power consumption, a voltage parameter, a battery drain rate, or a temporal parameter. At step 1130, the computing device may determine the active state of the second computing device. The computing device may determine the active state based on the adjusted parameter of the power cycle. For example, the device may determine the active state to receive, from the second computing device, a response to a message sent to the second computing device.

The second computing device may activate a function of the second computing device. The function may be activated based on the instruction. The second computing device may detect, by a sensor of the computing device, a response to the activated function. The second computing device may determine a sensing signature. The sensing signature may be determined based on the response to the activated function. The second computing device may determine the location information of the second computing device. The location information may be determined based on the sensing signature. The second computing device may cause output of an indication of the location information. The computing device may send an instruction to determine location information of the second computing device configured to control a third computing device. The computing device may determine an alternate computing device. The alternate computing device may be determined based on sending the instruction. The computing device may cause output of an option to select the alternate computing device. The computing device may receive a selection of the option. The computing device may configure the alternate computing device to control the third computing device.

Figure 12:
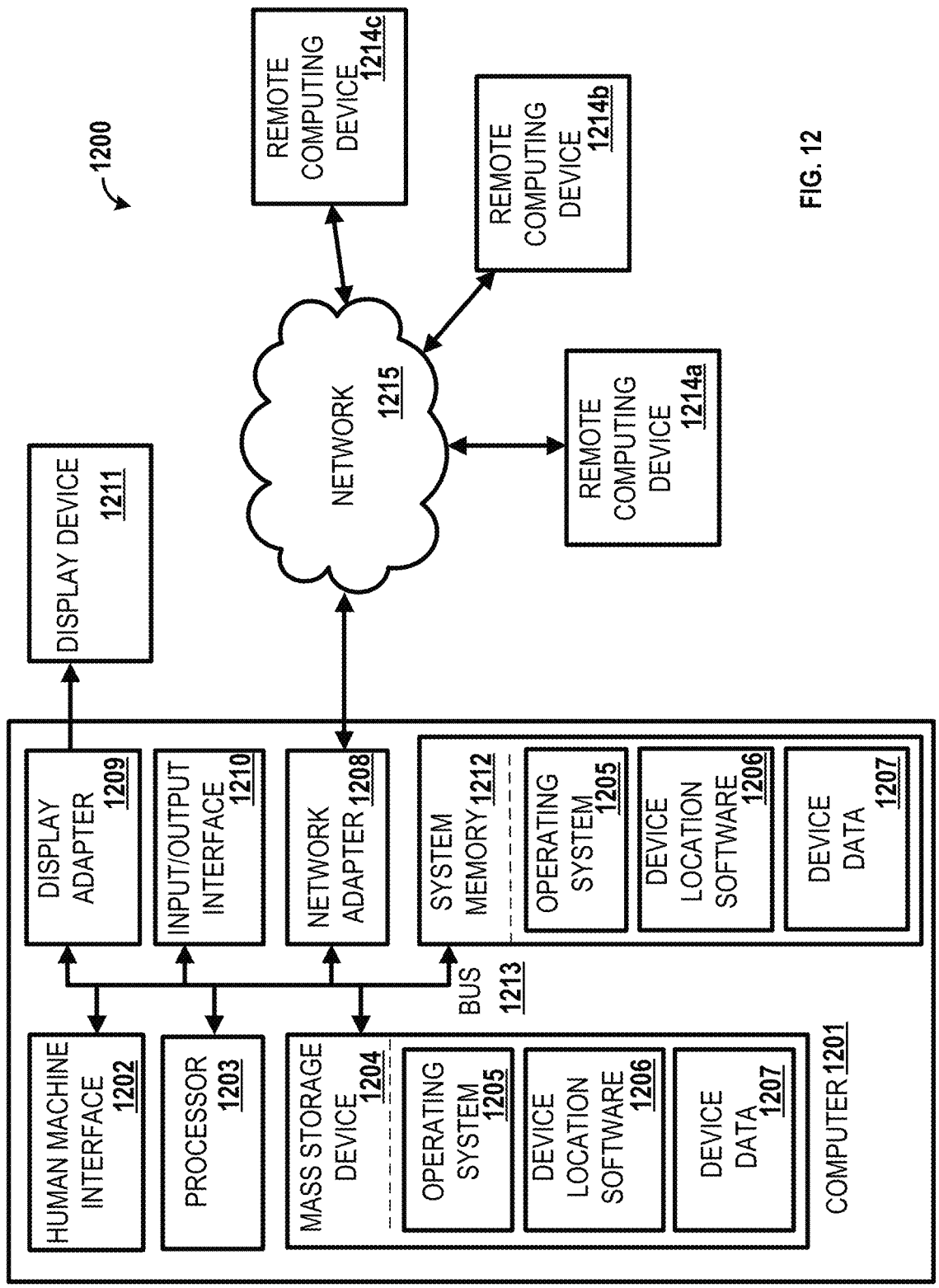
FIG. 12 shows a block diagram of an example computing device in which the present methods and systems may operate.

The methods and systems may be implemented on a computer 1201 as illustrated in FIG. 12 and described below. Similarly, the methods and systems disclosed may utilize one or more computers to perform one or more functions in one or more locations. FIG. 12 shows a block diagram illustrating an exemplary operating environment 1200 for performing the disclosed methods. This exemplary operating environment 1200 is only an example of an operating environment and is not intended to suggest any limitation as to the scope of use or functionality of operating environment architecture. Neither should the operating environment 1200 be interpreted as having any dependency or requirement relating to any one or combination of components illustrated in the exemplary operating environment 1200.

The present methods and systems may be operational with numerous other general purpose or special purpose computing system environments or configurations. Examples of well-known computing systems, environments, and/or configurations that may be suitable for use with the systems and methods comprise, but are not limited to, personal computers, server computers, laptop devices, and multiprocessor systems. Additional examples comprise set-top boxes, programmable consumer electronics, network PCs, minicomputers, mainframe computers, distributed computing environments that comprise any of the above systems or devices, and the like.

The processing of the disclosed methods and systems may be performed by software components. The disclosed systems and methods may be described in the general context of computer-executable instructions, such as program modules, being executed by one or more computers or other devices. Generally, program modules comprise computer code, routines, programs, objects, components, data structures, and/or the like that perform particular tasks or implement particular abstract data types. The disclosed methods may also be practiced in grid-based and distributed computing environments where tasks are performed by remote processing devices that are linked through a communications network. In a distributed computing environment, program modules may be located in local and/or remote computer storage media including memory storage devices.

The control device 102, the computing device 114, the control device 102 and/or other devices shown in FIGS. 1-5 may be or include a computer 1201 as shown in the block diagram 1200 of FIG. 12. The computer 1201 may include one or more processors 1203, a system memory 1212, and a bus 1213 that couples various system components including the one or more processors 1203 to the system memory 1212. In the case of multiple processors 1203, the computer 1201 may utilize parallel computing. The bus 1213 is one or more of several possible types of bus structures, including a memory bus or memory controller, a peripheral bus, an accelerated graphics port, or local bus using any of a variety of bus architectures.

The computer 1201 may operate on and/or include a variety of computer readable media (e.g., non-transitory). The readable media may be any available media that is accessible by the computer 1201 and may include both volatile and non-volatile media, removable and non-removable media. The system memory 1212 has computer readable media in the form of volatile memory, such as random access memory (RAM), and/or non-volatile memory, such as read only memory (ROM). The system memory 1212 may store data such as the trick play data 1207 and/or program modules such as the operating system 1205 and the manifest modification software 1206 that are accessible to and/or are operated on by the one or more processors 1203.

The computer 1201 may also have other removable/non-removable, volatile/non-volatile computer storage media. FIG. 10 shows the mass storage device 1204 which may provide non-volatile storage of computer code, computer readable instructions, data structures, program modules, and other data for the computer 1201. The mass storage device 1204 may be a hard disk, a removable magnetic disk, a removable optical disk, magnetic cassettes or other magnetic storage devices, flash memory cards, CD-ROM, digital versatile disks (DVD) or other optical storage, random access memories (RAM), read-only memories (ROM), electrically erasable programmable read-only memory (EEPROM), and/or the like.

Any quantity of program modules may be stored on the mass storage device 1204, such as the operating system 1205 and the device location software 1206. Each of the operating system 1205 and the device location software 1206 (or some combination thereof) may include elements of the program modules and the device location software 1206. The device location software 1206 may include processor-executable instructions that cause sending or receiving an instruction to determine location information associated with a computing device. The location information may be determined based on a sensing signature. The device location software 1206 may include processor-executable instructions that control activation of a function of the computing device. The device data 1207 may be stored on the mass storage device 1204. The device data 1207 may comprise at least one of: historical data, quantity of instructions sent or received, user-configurable parameters, battery parameter data, power cycle data, device usage data, and/or the like. The device data 1207 may be stored in any of one or more databases (e.g., database 119) known in the art. Such databases may be DB2®, Microsoft® Access, Microsoft® SQL Server, Oracle®, MySQL, PostgreSQL, and the like. The databases may be centralized or distributed across locations within the network 1215.

A user may enter commands and information into the computer 1201 via an input device (not shown). Examples of such input devices include, but are not limited to, a keyboard, pointing device (e.g., a computer mouse, remote control), a microphone, a joystick, a scanner, tactile input devices such as gloves, and other body coverings, motion sensor, and the like. These and other input devices may be connected to the one or more processors 1203 via a human-machine interface 1202 that is coupled to the bus 1213, but may be connected by other interface and bus structures, such as a parallel port, game port, an IEEE 1394 Port (also known as a Firewire port), a serial port, network adapter 1208, and/or a universal serial bus (USB).

The display device 1211 may also be connected to the bus 1213 via an interface, such as the display adapter 1209. It is contemplated that the computer 1201 may include more than one display adapter 1209 and the computer 1201 may include more than one display device 1211. The display device 1211 may be a monitor, an LCD (Liquid Crystal Display), light emitting diode (LED) display, television, smart lens, smart glass, and/or a projector. In addition to the display device 1211, other output peripheral devices may be components such as speakers (not shown) and a printer (not shown) which may be connected to the computer 1201 via the Input/Output Interface 1210. Any step and/or result of the methods may be output (or caused to be output) in any form to an output device. Such output may be any form of visual representation, including, but not limited to, textual, graphical, animation, audio, tactile, and the like. The display device 1211 and computer 1201 may be part of one device, or separate devices.

The computer 1201 may operate in a networked environment using logical connections to one or more remote computing devices 1214a, 1214b, 1214c. A remote computing device may be a personal computer, computing station (e.g., workstation), portable computer (e.g., laptop, mobile phone, tablet device), smart device (e.g., smartphone, smartwatch, activity tracker, smart apparel, smart accessory), security and/or monitoring device, a server, a router, a network computer, a peer device, edge device, and so on. Logical connections between the computer 1201 and a remote computing device 1214a, 1214b, 1214c may be made via a network 1215, such as a local area network (LAN) and/or a general wide area network (WAN). Such network connections may be through the network adapter 1208. The network adapter 1208 may be implemented in both wired and wireless environments. Such networking environments are conventional and commonplace in dwellings, offices, enterprise-wide computer networks, intranets, and the Internet.

Application programs and other executable program components such as the operating system 1205 are shown herein as discrete blocks, although it is recognized that such programs and components reside at various times in different storage components of the computing device 1201, and are executed by the one or more processors 1203 of the computer. An implementation of the device location software 1206 may be stored on or sent across some form of computer readable media. Any of the described methods may be performed by processor-executable instructions embodied on computer readable media.

For purposes of illustration, application programs and other executable program components such as the operating system 1205 are illustrated herein as discrete blocks, although it is recognized that such programs and components may reside at various times in different storage components of the computing device 1201, and are executed by the one or more processors 1203 of the computer 1201. An implementation of device location software 1206 may be stored on or transmitted across some form of computer readable media. Any of the disclosed methods may be performed by computer readable instructions embodied on computer readable media. Computer readable media may be any available media that may be accessed by a computer. By way of example and not meant to be limiting, computer readable media may comprise "computer storage media" and "communications media." "Computer storage media" may comprise volatile and non-volatile, removable and non-removable media implemented in any methods or technology for storage of information such as computer readable instructions, data structures, program modules, or other data. Exemplary computer storage media may comprise RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by a computer.

While the methods and systems have been described in connection with specific examples, it is not intended that the scope be limited to the particular embodiments set forth, as the embodiments herein are intended in all respects to be illustrative rather than restrictive. Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

It will be apparent to those skilled in the art that various modifications and variations may be made without departing from the scope or spirit. Other embodiments will be apparent to those skilled in the art from consideration of the specification and practice described herein. It is intended that the specification and examples be considered as exemplary only, with a true scope and spirit being indicated by the following claims.

What is claimed is:

1. A method comprising:
receiving, by a control device, an instruction to determine location information associated with the control device;
activating, based on the instruction, a function of the control device;
detecting, by a sensor of the control device, a response to a result of the function, wherein the response to the result of the function is used to determine the location information for the control device;
determining, by the control device and based on the response to the result of the function, a sensing signature;
determining, based on the sensing signature, the location information; and
causing output of an indication of the location information.

2. The method of claim 1, wherein receiving the instruction comprises receiving, from a user device associated with a user, a voice query for a location of the control device, wherein the control device comprises a remote control.

3. The method of claim 1, wherein detecting the response to the result of the function comprises receiving an image, wherein the image is indicative of a type of surface.

4. The method of claim 1, wherein the result of the function comprises outputting a sound within a frequency range, wherein the frequency range is associated with an accessibility requirement of a user.

5. The method of claim 1, wherein determining the location information comprises determining the location information based on the sensing signature being indicative of a characteristic of vibration and wherein the characteristic of vibration is associated with a type of surface.

6. The method of claim 1, wherein determining the location information comprises determining the location information based on the sensing signature being indicative of a light pattern and wherein the light pattern is associated with a type of surface.

7. The method of claim 1, wherein determining the location information comprises determining the location information based on the sensing signature being indicative of a signal strength of a wireless signal, wherein the signal strength is associated with a type of surface, and wherein the wireless signal comprises a radio frequency (RF) signal.

8. A method comprising:
sending an instruction to determine location information of a computing device configured to control a second computing device;
determining, based on a failure to determine the location information according to a response based on the instruction, that the computing device cannot be located;
determining, based on the failure, an alternate computing device;
causing output of an option to select the alternate computing device;
receiving a selection of the option; and
configuring the alternate computing device to control the second computing device.

9. The method of claim 8, wherein causing output of the option comprises outputting an indication of a plurality of alternate computing devices located within a threshold distance from the computing device.

10. The method of claim 8, wherein receiving the selection of the option comprises receiving, via a user interface, a selection of the alternate computing device when the alternate computing device is in proximity to the second computing device.

11. The method of claim 8, wherein configuring the alternate computing device to control the second computing device comprises pairing the alternate computing device with the second computing device.

12. The method of claim 8, wherein the instruction to determine the location information relates to receiving an image.

13. The method of claim 8, wherein the instruction to determine the location information relates to outputting a sound within a frequency range, wherein the frequency range is associated with an accessibility requirement of a user.

14. The method of claim 8, wherein the instruction to determine the location information relates to a sensing signature being indicative of a characteristic of vibration.

15. The method of claim 8, wherein the instruction to determine the location information relates to a sensing signature being indicative of a light pattern.

16. The method of claim 8, wherein the instruction to determine the location information relates to a sensing signature being indicative of a signal strength of a wireless signal, and wherein the wireless signal comprises a radio frequency (RF) signal.

17. A method comprising:
  determining, by a first computing device, a quantity associated with receiving an instruction to determine location information associated with a second computing device;
  adjusting, based on the quantity associated with receiving the instruction, a parameter of a power cycle of the second computing device; and
  determining, based on the adjusted parameter of the power cycle, an active state of the second computing device.

18. The method of claim 17, wherein determining the quantity associated with the instruction received comprises determining a classification of the second computing device, wherein the second computing device comprises a remote control.

19. The method of claim 17, wherein adjusting the parameter of the power cycle comprises:
  determining whether the quantity associated with the instruction received is above a threshold;
  increasing, based on the quantity associated with the instruction received being above the threshold, a periodicity of the power cycle, wherein the periodicity defines when the second computing device transitions from a sleep state to the active state; and
  decreasing, based on the quantity associated with the instruction received being below the threshold, the periodicity of the power cycle.

20. The method of claim 1, wherein the function generates at least one of a vibration at the control device, a light output at the control device, an image associated with the control device, a wireless signal associated with the control device, or an audio output at the control device.

21. The method of claim 1, wherein the result of the function is one or more of vibration, light output, a wireless signal, an audio output, or an image of an area adjacent to the control device.

22. The method of claim 1, wherein detecting the response to the result of the function comprises one or more of measuring a vibration at the control device, measuring an amount of reflected light at the control device, determining a signal strength of a received wireless signal, determining an audio feedback, or evaluating an image of an area adjacent to the control device.

* * * * *